US012616221B2

(12) United States Patent (10) Patent No.: US 12,616,221 B2
Emmambux et al. (45) Date of Patent: May 5, 2026

(54) LIPID-MODIFIED STARCHES

(71) Applicant: UNIVERSITY OF PRETORIA, Pretoria (ZA)

(72) Inventors: Mohammad Naushad Emmambux, Centurion (ZA); Humbulani Emmanuel Nekhudzhiga, Pretoria (ZA)

(73) Assignee: UNIVERSITY OF PRETORIA, Pretoria (ZA)

( * ) Notice: Subject to any disclaimer, the term of this patent is extended or adjusted under 35 U.S.C. 154(b) by 737 days.

(21) Appl. No.: 17/620,525

(22) PCT Filed: Jun. 18, 2020

(86) PCT No.: PCT/IB2020/055685
§ 371 (c)(1),
(2) Date: Dec. 17, 2021

(87) PCT Pub. No.: WO2020/255001
PCT Pub. Date: Dec. 24, 2020

(65) Prior Publication Data
US 2022/0312788 A1 Oct. 6, 2022

(30) Foreign Application Priority Data
Jun. 18, 2019 (ZA) ................................. 2019/03913

(51) Int. Cl.
*A23D 7/04* (2006.01)
*A23D 7/005* (2006.01)
(Continued)

(52) U.S. Cl.
CPC ............. *A23D 7/04* (2013.01); *A23D 7/0053* (2013.01); *A23D 7/015* (2013.01); *A23L 27/60* (2016.08); *A23L 29/212* (2016.08)

(58) Field of Classification Search
None
See application file for complete search history.

(56) References Cited

U.S. PATENT DOCUMENTS 4,491,483 A 1/1985 Dudacek et al.
6,017,388 A 1/2000 Yuan

FOREIGN PATENT DOCUMENTS

WO WO 2017096411 A2 6/2017

OTHER PUBLICATIONS

Bamidele et al., "Encapsulation and antioxidant activity of ascorbyl palmitate with maize starch during pasting". Carbohydrate Polymers 166 (2017) pp. 202-208. (Year: 2017).*

(Continued)

*Primary Examiner* — Erik Kashnikow
*Assistant Examiner* — Assaf Zilbering
(74) *Attorney, Agent, or Firm* — Cozen O'Connor

(57) ABSTRACT

The present invention relates to lipid-modified starches. It provides a process for preparing a lipid-modified starch paste, which includes the steps of combining starch with a lipid component, the lipid component being selected from any one of monoglyceride and ascorbyl palmitate, to provide a suspension, and heat processing the suspension to form the lipid-modified starch paste. The invention also provides a lipid-modified starch paste, which includes a plurality of spherical micro-particles, each spherical micro-particle having a starch core with an amylose-lipid complex layer on an outer surface of the starch core, the amylose-lipid complex layer operable to regulate water absorption capability of the starch core. The invention further extends to provide various uses of a lipid-modified starch paste as a partial or total fat and/or oil replacement in a foodstuff, an improved fat-and/or oil-containing foodstuff and in particular, a low-calorie mayonnaise.

8 Claims, 12 Drawing Sheets

(51) Int. Cl.
  *A23D 7/015* (2006.01)
  *A23L 27/60* (2016.01)
  *A23L 29/212* (2016.01)

(56) References Cited

OTHER PUBLICATIONS

Chao et al., "Toward a Better Understanding of Starch-Monoglyceride-Protein Interactions". J. Agric. Food Chem. 2018, 66, 13253-13259. (Year: 2018).*

"Mono- and Diglycerides". Available online at https://www.fao.org/fileadmin/user_upload/jecfa_additives/docs/Monograph1/Additive-288.pdf on Oct. 13, 2021. (Year: 2021).*

Barnes, H. A. 1995. A review of the slip (wall depletion) of polymer solutions, emulsions and particle suspensions in viscometers: its cause, character, and cure. Journal of Non-Newtonian Fluid Mechanics, 56, 221-251.

Barnes, H. A. & Nguyen, Q. D. 2001. Rotating vane rheometry—a review. Journal of Non-Newtonian Fluid Mechanics, 98, 1-14.

Biliaderis, C. G. & Galloway, G. 1989. Crystallization behaviour of amylose-V complexes: structure-property relationships. Carbohydrate Research, 189, 31-48.

Eliasson, A. C. 1994. Interactions between starch and lipids studied by DSC. Thermochimica Acta, 246, 343-356.

Fannon, J. E., et al., 1992. Surface pores of starch granules. Cereal Chemistry, 69, 284-288.

Gallant, D. J., et al., 1997. Microscopy of starch: evidence of a new level of granule organization. Carbohydrate Polymers, 32, 177-191.

Galloway, G., Biliaderis, C. & Stanley, D. 1989. Properties and structure of amylose-glyceryl monostearate complexes formed in solution or on extrusion of wheat flour. Journal of Food Science, 54, 950-957.

Gidley, M. J. 1989. Molecular mechanisms underlying amylose aggregation and gelation. Macromolecules, 22, 351-358.

Höhne, G. W., et al. 2003. Temperature-modulated differential scanning calorimetric measurements on pre-melting behavior of nascent ultrahigh molecular mass polyethylene. Thermochimica Acta, 396, 97-108.

Huber, K. & Bemiller, J. 2000. Channels of maize and sorghum starch granules. Carbohydrate Polymers, 41, 269-276.

Karkalas, J., et al.. 1995. Some factors determining the thermal properties of amylose inclusion complexes with fatty acids. Carbohydrate Research, 268, 233-247.

Larsson, K., Fontell, K. & Krog, N. 1980. Structural relationships between lamellar, cubic and hexagonal phases in monoglyceride-water systems. Possibility of cubic structures in biological systems. Chemistry and Physics of Lipids, 27, 321-328.

Liu, H., Lelievre, J. & Ayoung-Chee, W. 1991. A study of starch gelatinization using differential scanning calorimetry, X-ray, and birefringence measurements. Carbohydrate Research, 210, 79-87.

Putseys, J., Lamberts, L. & Delcour, J. 2010. Amylose-inclusion complexes: Formation, identity and physico-chemical properties. Journal of Cereal Science, 51, 238-247.

Sein, A., et al. 2002. Rheological characterization, crystallization, and gelation behavior of monoglyceride gels. Journal of Colloid and Interface Science, 249, 412-422.

Taggart, P. & Mitchell, J. 2009. Starch. In: Philips, G. O. and Williams, P. A. (eds.) Handbook of Hydrocolloids (Second Edition). Cambridge, Woodhead Publishing Ltd. 108-141.

PCT/IB2020/055685 International Search Report and Written Opinion dated Oct. 13, 2020, 11 pages.

* cited by examiner

Control is maize starch without monoglyceride and ascorbyl palmitate
MG is Monoglyceride (5% & 10% w/w of starch)
AP is Ascorbly Palmitate (5% & 10% w/w of starch)

Control is maize starch without monoglyceride and ascorbyl palmitate
MG is Monoglyceride (5% & 10% w/w of starch)
AP is Ascorbly Palmitate (5% & 10% w/w of starch)

*Control is maize starch without monoglyceride and ascorbyl palmitate*
*MG is Monoglyceride (5% & 10% w/w of starch)*
*AP is Ascorbly Palmitate (5% & 10% w/w of starch)*
*Homogenization was at 8000 rpm for 5 minutes*

*Control is maize starch without monoglyceride and ascorbyl palmitate*
*MG is Monoglyceride (5% & 10% w/w of starch)*
*AP is Ascorbly Palmitate (5% & 10% w/w of starch)*
*Homogenization was at 8000 rpm for 5 minutes*

*Control is maize starch without MG and AP*
*MG is Monoglyceride (5% & 10% w/w of starch)*
*AP is Ascorbly Palmitate (5% & 10% w/w of starch)*
*[a]Endotherms for excess MG and AP*
*[b]Endotherms with a temperature range of 98.3-110.1°C*

*Control is maize starch without MG and AP*
*MG is Monoglyceride (5% & 10% w/w of starch)*
*AP is Ascorbly Palmitate (5% & 10% w/w of starch)*
*[b]Endotherms with a temperature range of 97.7-109.3°C*

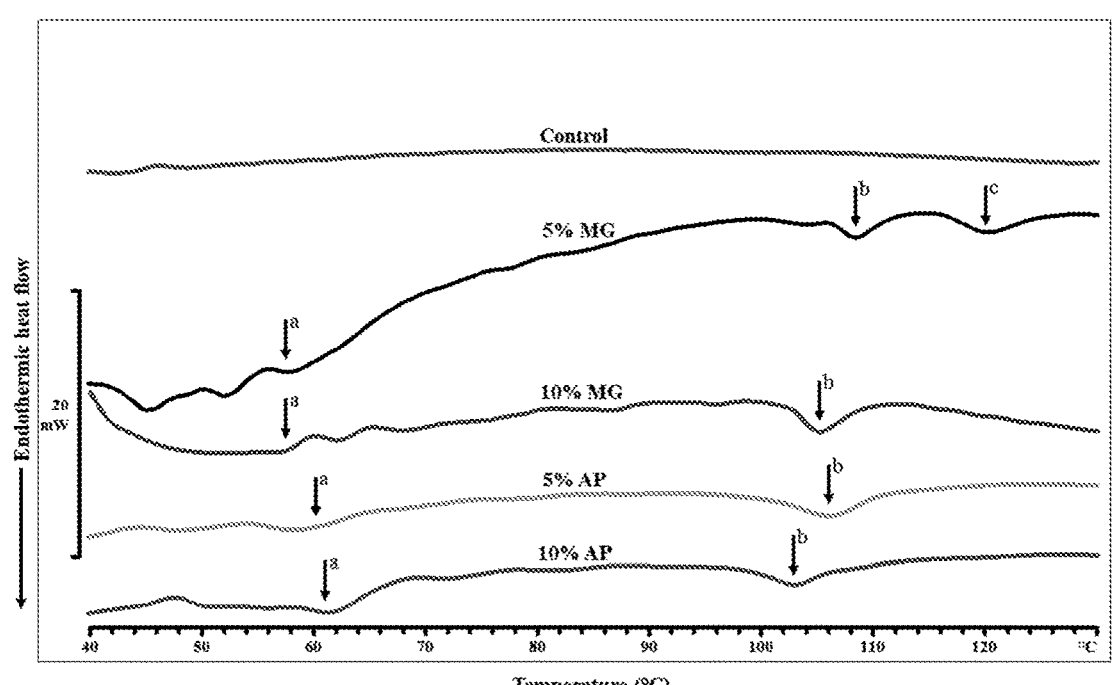

FIGURE 11

Control is maize starch without MG and AP
MG is Monoglyceride (5% & 10% w/w of starch)
AP is Ascorbly Palmitate (5% & 10% w/w of starch)
[a]Endotherms for excess MG and AP
[b]Endotherms with a temperature range of 96.7-109.9°C
[c]Endotherms with a temperature range of 112.8-121.5 °C

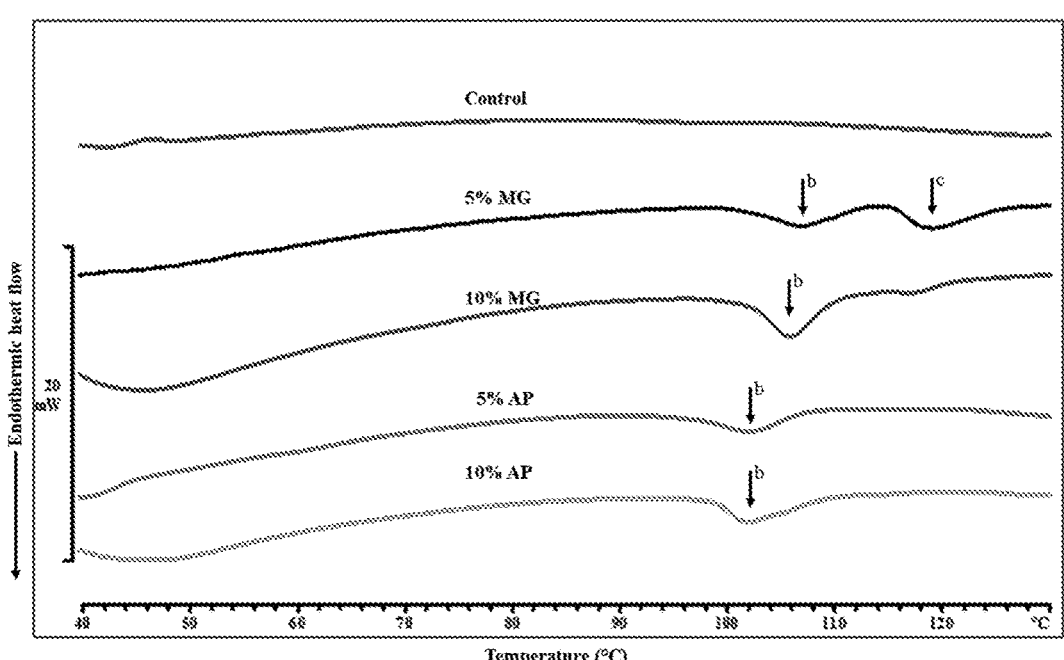

FIGURE 12

Control is maize starch without MG and AP
MG is Monoglyceride (5% & 10% w/w of starch)
AP is Ascorbly Palmitate (5% & 10% w/w of starch)
[b]Endotherms with a temperature range of 97.4-110.4°C
[c]Endotherms with a temperature range of 114.7-124.3 °C

*Control is maize starch without MG and AP*
*MG is Monoglyceride*
*AP is Ascorbyl Palmitate*
*SGB is Starch Granule Birefringence*
*SG is Starch Granule/s*

*Control is maize starch without MG and AP*
*MG is Monoglyceride*
*AP is Ascorbyl Palmitate*
*SGB is Starch Granule Birefringence*
*SG is Starch Granule/s*

*Reference is commercial full fat mayonnaise*
*Control is low-calorie mayonnaise-type emulsion with maize starch paste only*
*MG is low-calorie mayonnaise-type emulsion with maize starch paste with 5% &10% Monoglyceride*
*AP is low-calorie mayonnaise-type emulsion with maize starch paste with 5% & 10% Ascorbyl Palmitate*

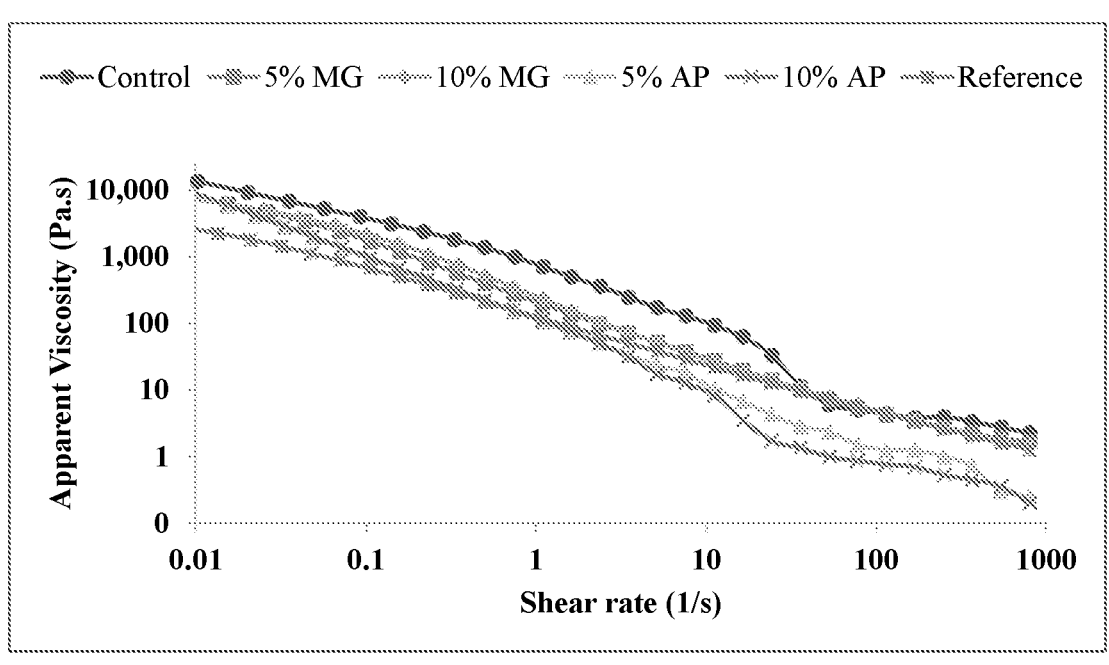
FIGURE 17
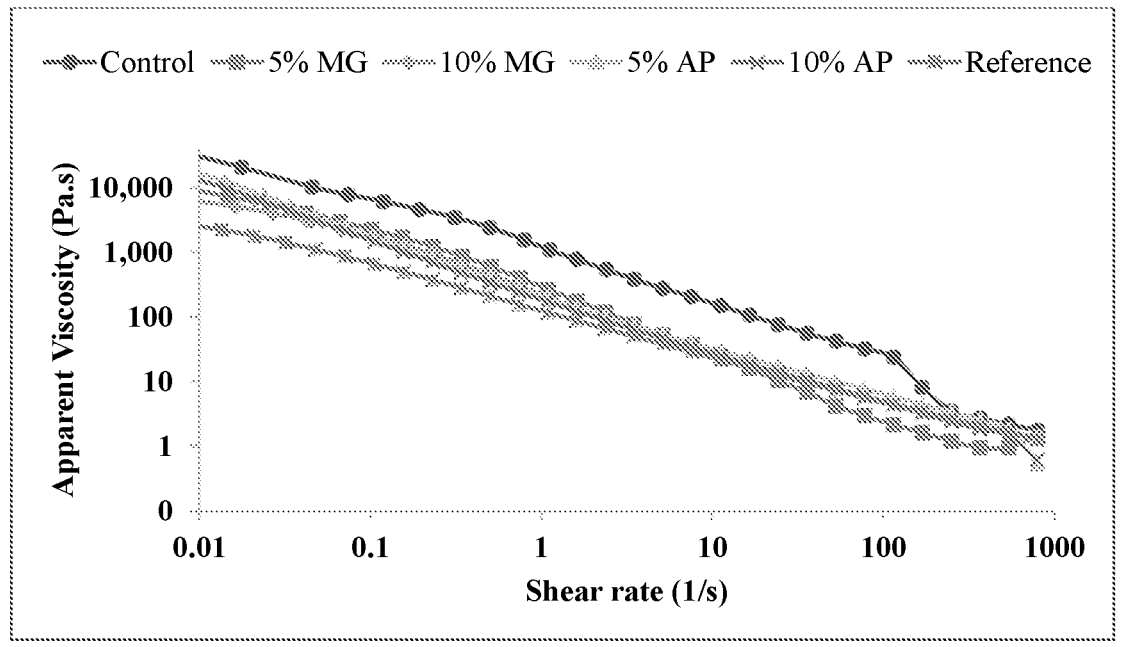
*Reference is commercial full fat mayonnaise*
*Control is low-calorie mayonnaise-type emulsion with maize starch paste only*
FIGURE 18 *MG is low-calorie mayonnaise-type emulsion with maize starch paste with 5% &10% Monoglyceride*
*AP is low-calorie mayonnaise-type emulsion with maize starch paste with 5% & 10% Ascorbyl Palmitate*

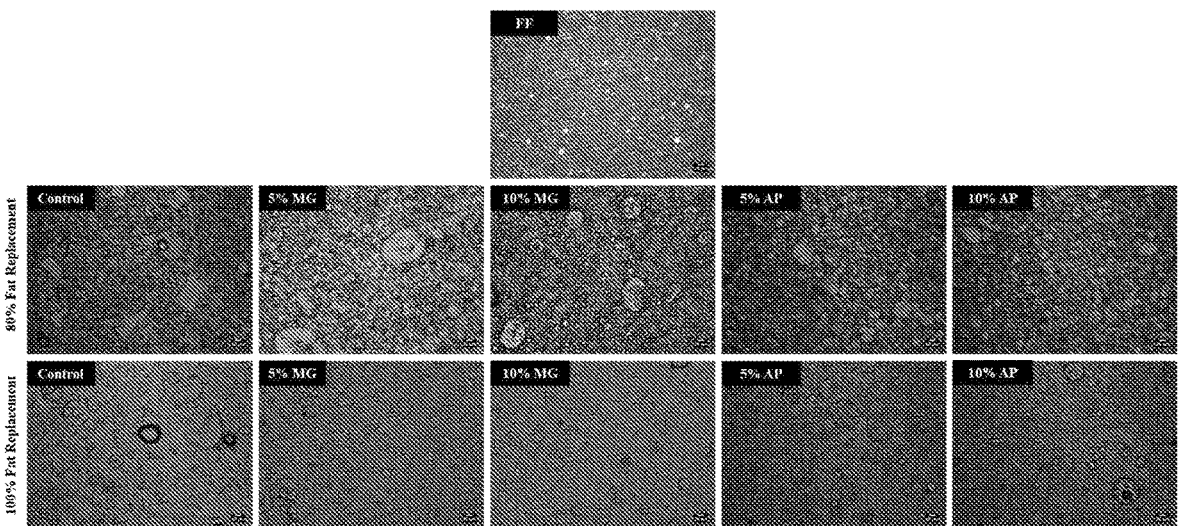

FF is full fat mayonnaise FIGURE 19
Control is starch without MG and AP
MG is Monoglyceride (5% & 10% w/w of starch)
AP is Ascorbyl Palmitate (5% & 10% w/w of starch)
*fat droplets and starch granules represent the discontinuous phase at 80% fat replacement and remaining space represents the continuous phase
**starch granules represent the discontinuous phase at 100% fat replacement and the remaining space represents the continuous phase

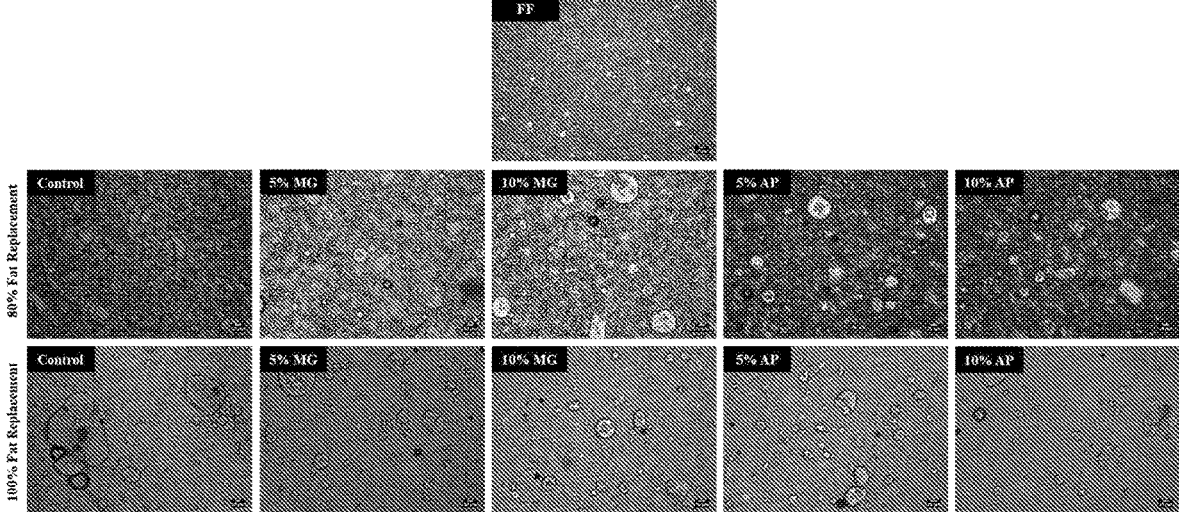

FF is full fat mayonnaise FIGURE 20
Control is starch without MG and AP
MG is Monoglyceride (5% & 10% w/w of starch)
AP is Ascorbyl Palmitate (5% & 10% w/w of starch)
*fat droplets and starch granules represent the discontinuous phase at 80% fat replacement
and remaining space represents the continuous phase
**starch granules represent the discontinuous phase at 100% fat replacement and the
remaining space represents the continuous phase

LIPID-MODIFIED STARCHES

FIELD OF THE INVENTION

This invention relates to lipid-modified starches. In particular, the invention relates to a process for preparing a lipid-modified starch paste, a lipid-modified starch paste, a use of a lipid-modified starch paste as a partial or total fat and/or oil replacement in a foodstuff, an improved fat-and/or oil-containing foodstuff and a low-calorie mayonnaise.

BACKGROUND OF THE INVENTION

Fat is one of the main macro-nutrients found in food, forming an integral part of the food system by serving specific functions. Fat can have an impact on the colour, texture, flavour, palatability and lubricity of food. Additionally, fat provides essential fatty acids, namely linolenic and linoleic acids, and assists in the adsorption of fat-soluble vitamins (A, D, E and K) by the body.

The growing occurrence of obesity has made the public conscious of the fat content in food. As a result, foods with low fat content have become increasingly popular. The formulation of these low-fat foods is a challenge however, as the functionalities of fat need to be carefully considered before fat replacement occurs in a food system.

Fat replacers are categorised either as fat substitutes, which have a physical structure similar to that of fat, or fat mimetics, which can mimic sensory and physical properties of fat. Fat replacers often fall short of mimicking the functional characteristics of fat which can negatively impact the physical stability, quality and in some cases, the microbiological stability, of the final low-fat product.

The inventor is aware of the variety of fat replacers presently available. As of yet, no single fat replacer has been developed with the ability to emulate all the properties of fat, address the concerns regarding product quality, microbiological aspects and safety, and satisfy the market. The inventor aims to address these needs by providing a novel fat replacer which mimics fat in low-fat food systems and is less costly to manufacture.

In this specification, reference is made to the following sources:

BARNES, H. A. 1995. A review of the slip (wall depletion) of polymer solutions, emulsions and particle suspensions in viscometers: its cause, character, and cure. Journal of Non-Newtonian Fluid Mechanics, 56, 221-251.

BARNES, H. A. & NGUYEN, Q. D. 2001. Rotating vane rheometry—a review. Journal of Non-Newtonian Fluid Mechanics, 98, 1-14.

BILIADERIS, C. G. & GALLOWAY, G. 1989. Crystallization behaviour of amylose-V complexes: structure-property relationships. Carbohydrate Research, 189, 31-48.

ELIASSON, A. C. 1994. Interactions between starch and lipids studied by DSC. Thermochimica Acta, 246, 343-356.

FANNON, J. E., HAUBER, R. J. & BEMILLER, J. N. 1992. Surface pores of starch granules. Cereal Chemistry, 69, 284-288.

GALLANT, D. J., BOUCHET, B. & BALDWIN, P. M. 1997. Microscopy of starch: evidence of a new level of granule organization. Carbohydrate Polymers, 32, 177-191.

GALLOWAY, G., BILIADERIS, C. & STANLEY, D. 1989. Properties and structure of amylose-glyceryl monostearate complexes formed in solution or on extrusion of wheat flour. Journal of Food Science, 54, 950-957.

GIDLEY, M. J. 1989. Molecular mechanisms underlying amylose aggregation and gelation. Macromolecules, 22, 351-358.

HOHNE, G. W., KURELEC, L., RASTOGI, S. & LEMSTRA, P. J. 2003. Temperature-modulated differential scanning calorimetric measurements on pre-melting behavior of nascent ultrahigh molecular mass polyethylene. Thermochimica Acta, 396, 97-108.

HUBER, K. & BEMILLER, J. 2000. Channels of maize and sorghum starch granules. Carbohydrate Polymers, 41, 269-276.

KARKALAS, J., M A, S., MORRISON, W. R. & PETHRICK, R. A. 1995. Some factors determining the thermal properties of amylose inclusion complexes with fatty acids. Carbohydrate Research, 268, 233-247.

LARSSON, K., FONTELL, K. & KROG, N. 1980. Structural relationships between lamellar, cubic and hexagonal phases in monoglyceride-water systems. Possibility of cubic structures in biological systems. Chemistry and Physics of Lipids, 27, 321-328.

LIU, H., LELIEVRE, J. & AYOUNG-CHEE, W. 1991. A study of starch gelatinization using differential scanning calorimetry, X-ray, and birefringence measurements. Carbohydrate Research, 210, 79-87.

PUTSEYS, J., LAMBERTS, L. & DELCOUR, J. 2010. Amylose-inclusion complexes: Formation, identity and physico-chemical properties. Journal of Cereal Science, 51, 238-247.

SEIN, A., VERHEIJ, J. A. & AGTEROF, W. G. 2002. Rheological characterization, crystallization, and gelation behavior of monoglyceride gels. Journal of Colloid and Interface Science, 249, 412-422.

TAGGART, P. & MITCHELL, J. 2009. Starch. In: Philips, G. O. and Williams, P. A. (eds.) Handbook of Hydrocolloids (Second Edition). Cambridge, Woodhead Publishing Ltd. 108-141.

SUMMARY OF THE INVENTION

Broadly according to one aspect of the invention there is provided a process for preparing a lipid-modified starch paste, which includes the steps of:

combining starch with a lipid component, the lipid component being selected from any one of monoglyceride and/or ascorbyl palmitate, to provide a suspension; and heat processing the suspension to form the lipid-modified starch paste.

The step of combining starch with a lipid component may include a first sub-step of dissolving the monoglyceride or ascorbyl palmitate in a solvent to form a monoglyceride-solvent solution or an ascorbyl palmitate-solvent solution respectively.

The monoglyceride-solvent solution may have a concentration in the range of approximately 5% to 10% monoglyceride (w/w of dried starch). In specific embodiments, the monoglyceride-solvent solution may have a concentration of 5% monoglyceride, 10% monoglyceride or the like, depending on desired properties of the lipid-modified starch paste.

The ascorbyl palmitate-solvent solution may have a concentration in the range of approximately 5% to 10% ascorbyl palmitate (w/w of dried starch). In specific embodiments, the ascorbyl palmitate-solvent solution may have a concentration of 5% monoglyceride, 10% monoglyceride or the like, depending on desired properties of the lipid-modified starch paste.

The solvent may be in the form of ethanol, specifically 95% ethanol.

The step of combining starch with a lipid component may include a second sub-step of adding the starch to either the monoglyceride-solvent solution or the ascorbyl palmitate-solvent solution to form a slurry.

The step of combining starch with a lipid component may include a third sub-step of mixing the slurry. Mixing the slurry may include shaking the slurry at an increased temperature for a predetermined amount of time. The increased temperature may be approximately 50° C. The predetermined amount of time may be approximately 30 minutes. Mixing the slurry may take place in a shaking water bath.

The step of combining starch with a lipid component may include a fourth sub-step of evaporating excess solvent from the slurry to provide the suspension. Evaporating excess solvent from the slurry to provide the suspension may include any one or both of: heating and stirring the slurry, and evaporating any remaining solvent in a force draught oven. Heating and stirring the slurry may be at a temperature of approximately 50° C. Evaporating any remaining solvent in a force draught oven may be at a temperature of approximately 50° C. for approximately 24 hours.

The starch may be in the form of maize starch or the like.

The monoglyceride may be in the form of edible grade monoglyceride.

The step of heat processing the suspension may be in the form of wet heat processing of the suspension.

Wet heat processing may include a first sub-step of adding water to the suspension to produce a hydrated suspension. Adding water to the suspension may be operable to minimize any one or both of lumping and settling of starch in subsequent sub-steps.

Wet heat processing may include a second sub-step of re-suspending any starch which may have settled in the hydrated suspension. Re-suspending any starch may include heating the hydrated suspension to approximately 50° C. and holding that approximate temperature for approximately 10 seconds whilst stirring at approximately 960 rpm.

Wet heat processing may include a third sub-step of pasting the hydrated suspension. Pasting the hydrated suspension may include heating the hydrated suspension to a predetermined temperature above the gelatinisation temperature of starch and stirring the hydrated suspension at a predetermined stirring speed for a predetermined amount of time, to effect pasting.

The predetermined temperature may be below boiling point of water. In one example, the predetermined temperature may be between 80° C. and 95° C. In a specific example, the predetermined temperature may be approximately 91° C. In this example, the hydrated suspension may be heated to approximately 91° C. at a rate of approximately 5.5° C. per minute.

The predetermined stirring speed may be between 100 rpm and 200 rpm. In a specific example, the predetermined stirring speed may be approximately 160 rpm.

Pasting the hydrated suspension may be in the form of a short pasting process or an extended pasting process, differing only in the amount of time for pasting to occur. In the short pasting process, the predetermined amount of time may be approximately 10 minutes. In the extended pasting process, the predetermined amount of time may be approximately 90 minutes.

Pasting the hydrated suspension may be performed in a closed system to minimize evaporation of water from the hydrated suspension during pasting.

Pasting the hydrated suspension may further include continuously monitoring viscosity of the lipid-modified starch paste with a rheometer, a Rapid Visco Analyzer (RVA) or the like.

The process for preparing a lipid-modified starch paste may include a final step of allowing the lipid-modified starch paste to cool to room temperature.

Broadly according to another aspect of the invention, there is provided a lipid-modified starch paste, which includes:

a plurality of spherical micro-particles, each spherical micro-particle having a starch core with an amylose-lipid complex layer on an outer surface of the starch core, the amylose-lipid complex layer operable to regulate water absorption capability of the starch core.

The plurality of spherical micro-particles may have an average particle size distribution of approximately 23 μm in diameter.

The plurality of spherical micro-particles may be deformable during homogenization and may each return to a spherical structure after homogenization. It is to be appreciated that the process of homogenization is interchangeable with any severe processing conditions or high shear conditions.

The lipid-modified starch paste may include excess lipids aligned between the plurality of spherical micro-particles. The excess lipids may be operable to function as a lubricant in the lipid-modified starch paste.

The lipid-modified starch paste may be produced according to the process for preparing a lipid-modified starch paste, as described above.

The lipid-modified starch paste may mimic any one or both the rheological properties and structure of fat and/or oil.

The lipid-modified starch paste may be non-gelling.

Another aspect of the invention provides a fat and/or oil replacement paste produced by wet heat processing starch with a lipid component, the lipid component being selected from any one of monoglyceride and ascorbyl palmitate.

The fat and/or oil replacement paste may be produced according to a process for preparing a lipid-modified starch paste, as described above. In particular, the fat and/or oil replacement paste may be a lipid-modified starch paste as described above.

Another aspect of the invention provides a use of a lipid-modified starch paste, as described above, as a partial or total fat and/or oil replacement in an emulsion type food foodstuff.

The use of a lipid-modified starch paste as a partial or total fat and/or oil replacement in a foodstuff may reduce a total calorie content of the foodstuff.

A further aspect of the invention provides an improved fat- and/or oil-containing foodstuff, wherein the improvement comprises partial or total replacement of fat and/or oil in an emulsion type food foodstuff with a lipid-modified starch paste, as described above.

The improved fat- and/or oil-containing foodstuff may have a reduced total calorie count as compared to a conventional fat- and/or oil-containing foodstuff counterpart.

The foodstuff may be selected from the group consisting of: yoghurt, sauces, ice cream, salad dressings, margarine, spreads, creamers, baked goods, other dairy products and the like.

In a specific example, the foodstuff may be mayonnaise.

Yet a further aspect of the invention provides a low-calorie mayonnaise, which includes:

a combination of egg yolk, vinegar, salt and sugar; and an oil-replacement component in the form of a lipid-modified starch paste, as described above.

In one embodiment, the lipid-modified starch paste may replace 100% of conventional oil content in mayonnaise.

In another embodiment, the low-calorie mayonnaise may also include oil. In particular, the low-calorie mayonnaise may include an approximate ratio of 8:2 of lipid-modified starch paste to oil. The ratio of 8:2 lipid-modified starch paste to oil may be operable to decrease apparent viscosity of the low-calorie mayonnaise as compared to low-calorie mayonnaise having 100% oil-replacement component in the form of a lipid-modified starch paste. The oil may be in the form of sunflower oil.

The egg yolk may be in the form of egg yolk powder.

The vinegar may be in the form of white spirit vinegar.

The low-calorie mayonnaise may be in the form of an emulsion of the combination of egg yolk, vinegar, salt and sugar, and the lipid-modified starch paste.

The low-calorie mayonnaise may be temperature-stable at approximately 5° C., the low-calorie mayonnaise not exhibiting phase separation after at least 24 hours at approximately 5° C.

The low-calorie mayonnaise may be non-gelling.

The invention will now be described by way of a non-limiting example only, with reference to the following figures.

DRAWINGS

Figure 3:
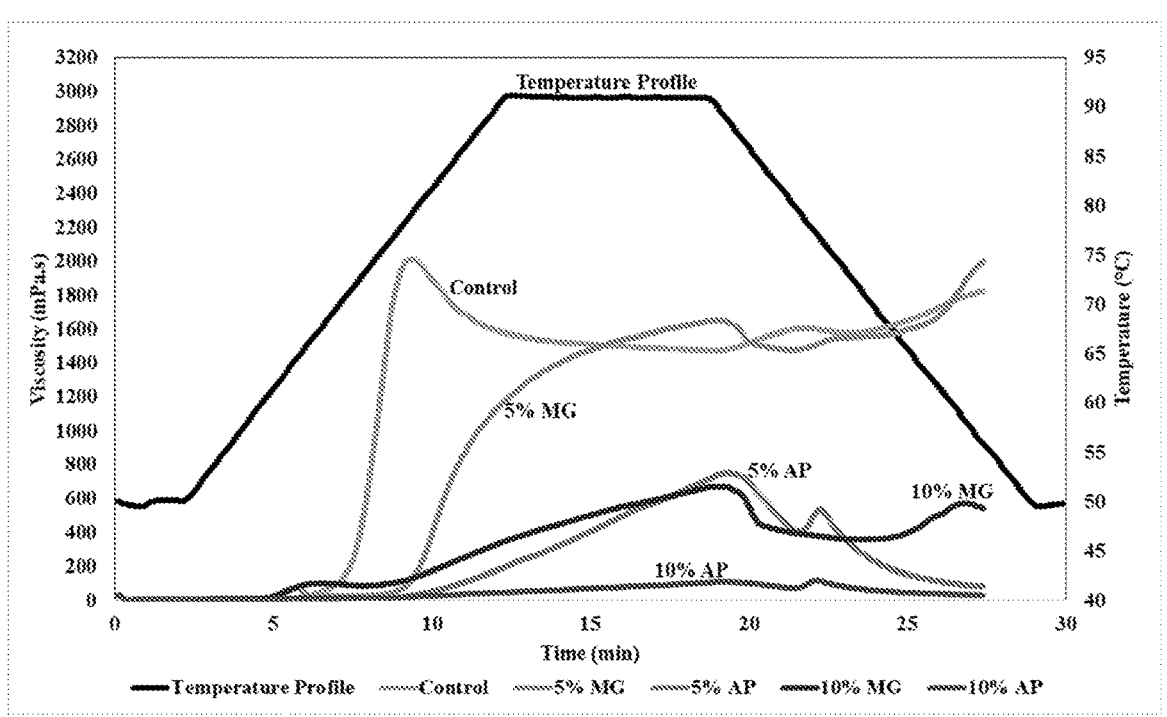
Figure 4:
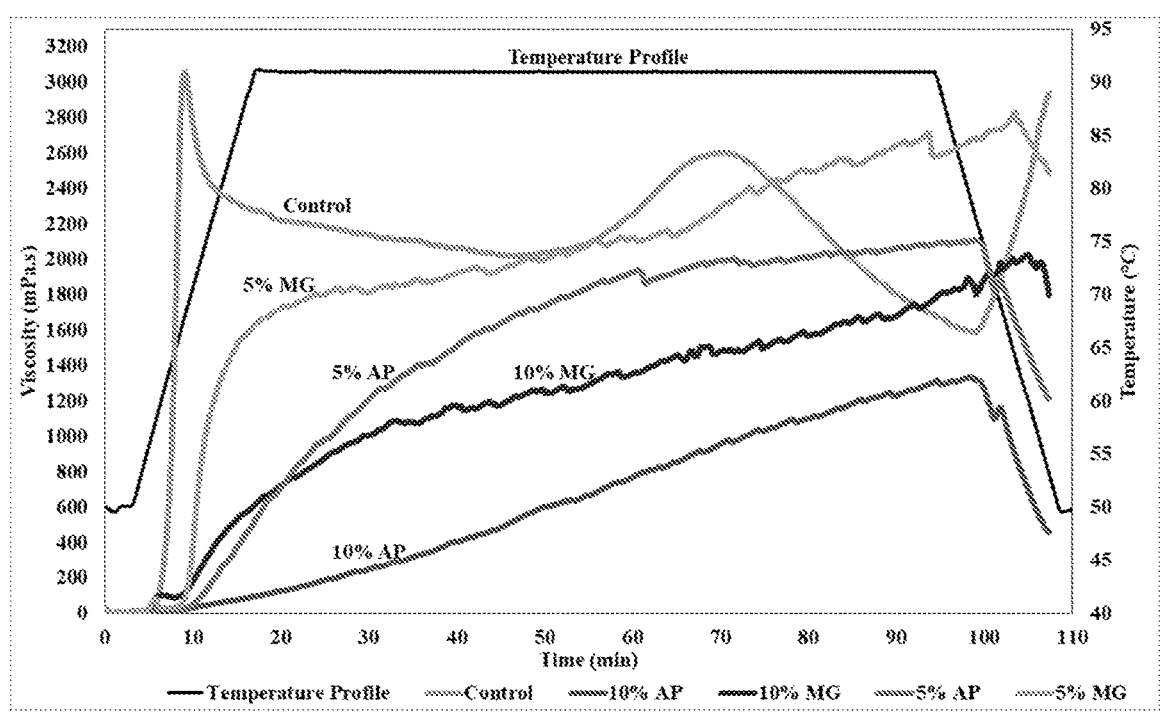
Figure 5:
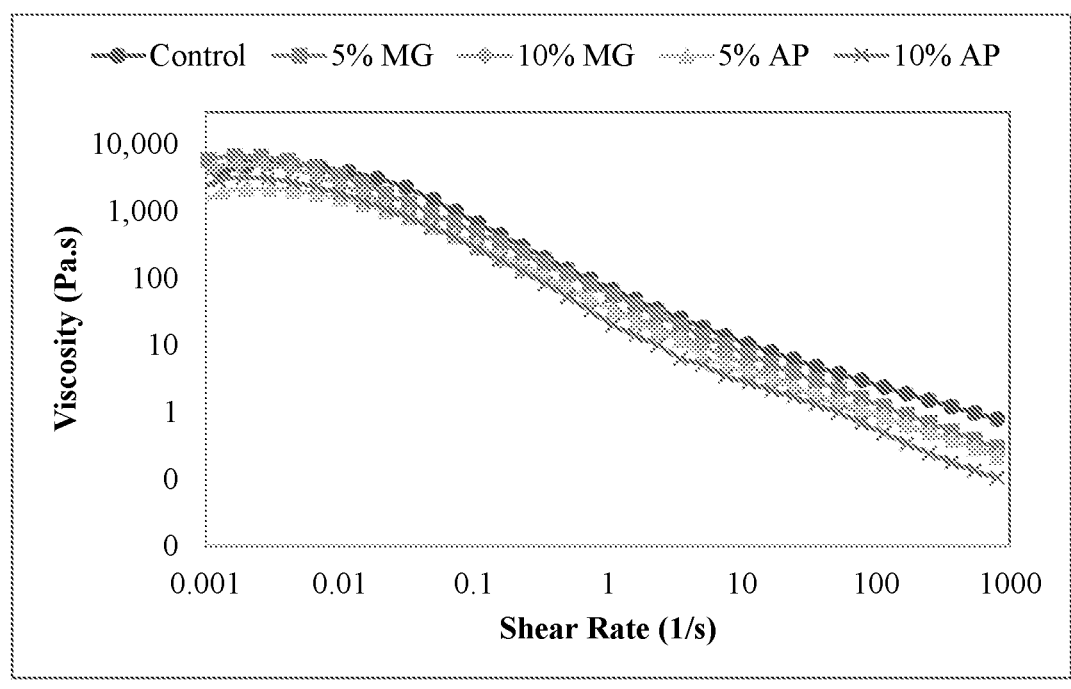
Figure 6:
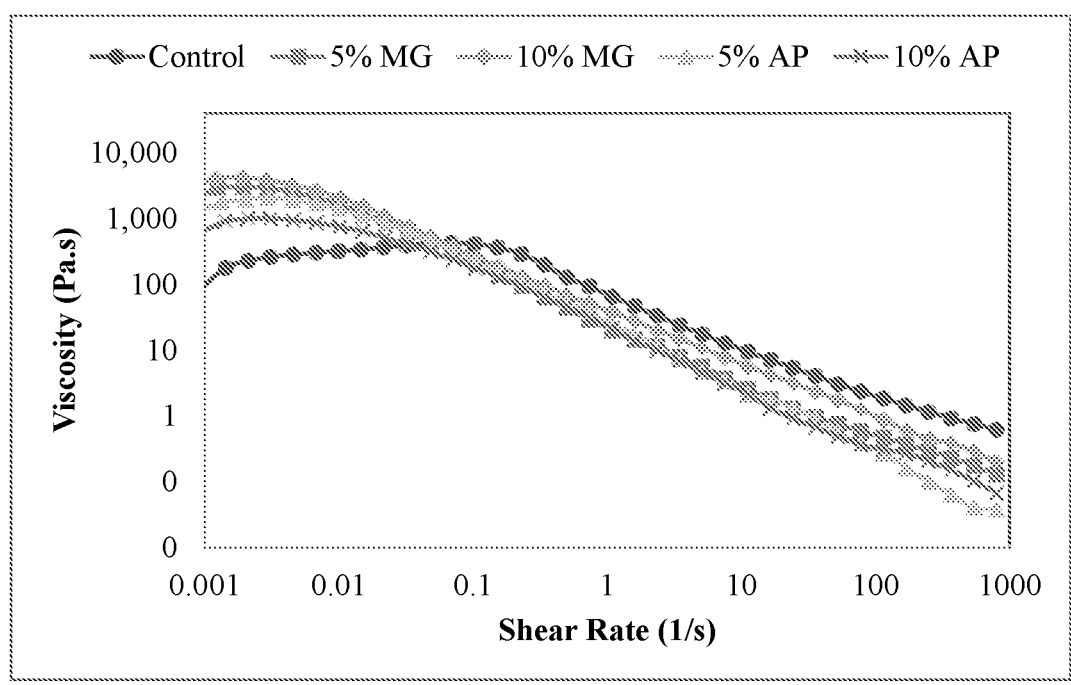
Figure 7:
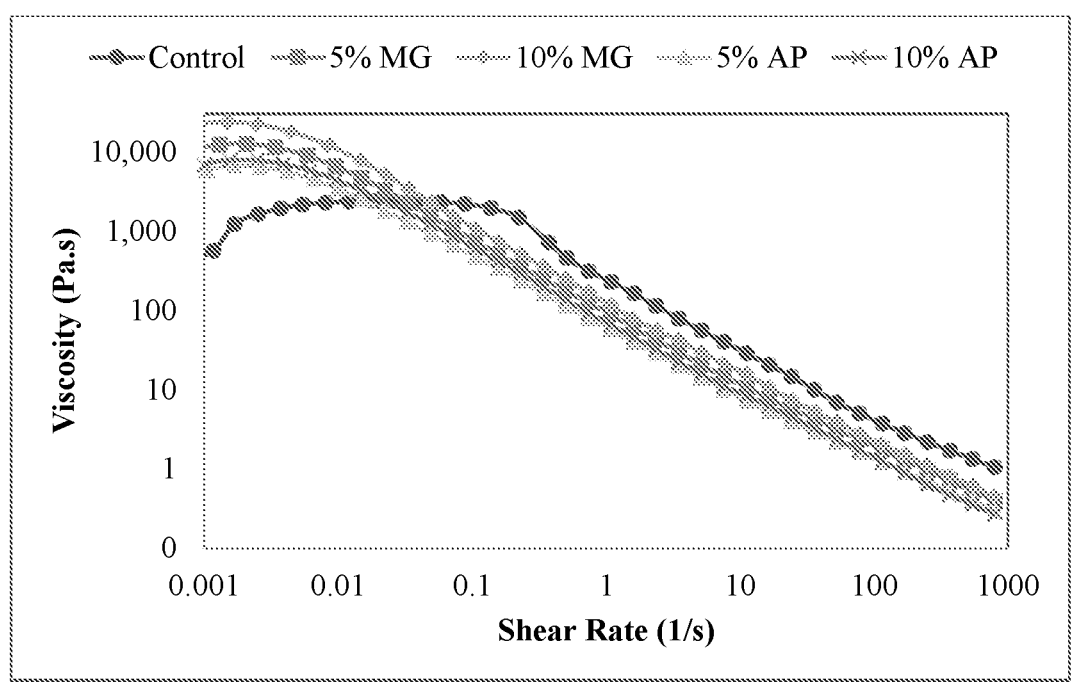
Figure 8:
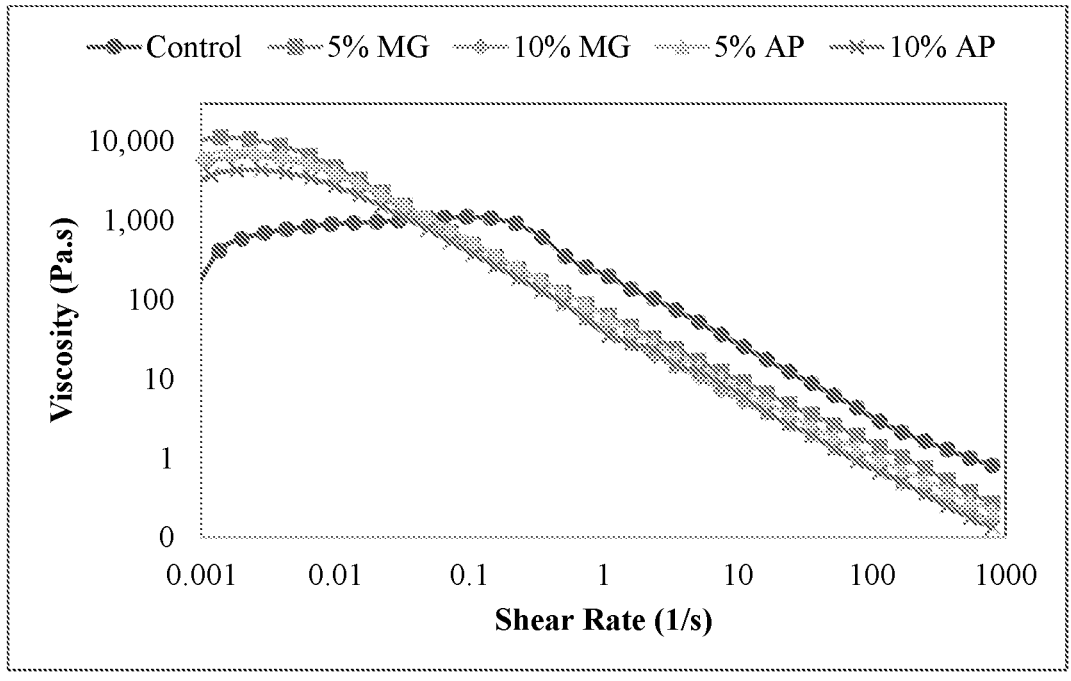
Figure 9:
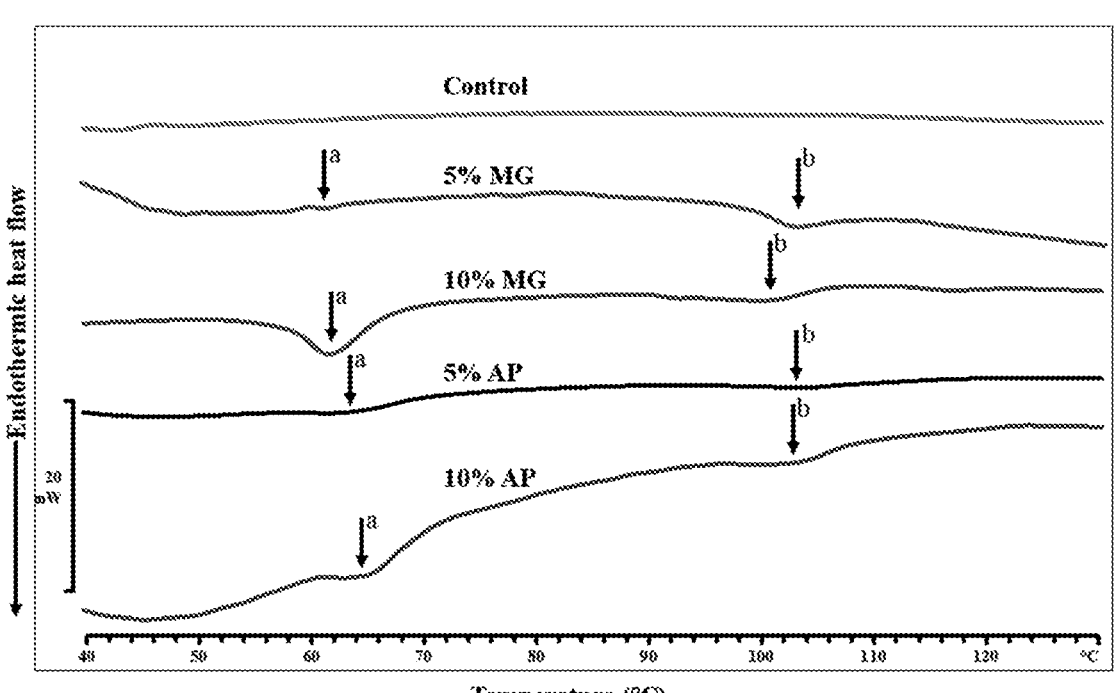
Figure 10:
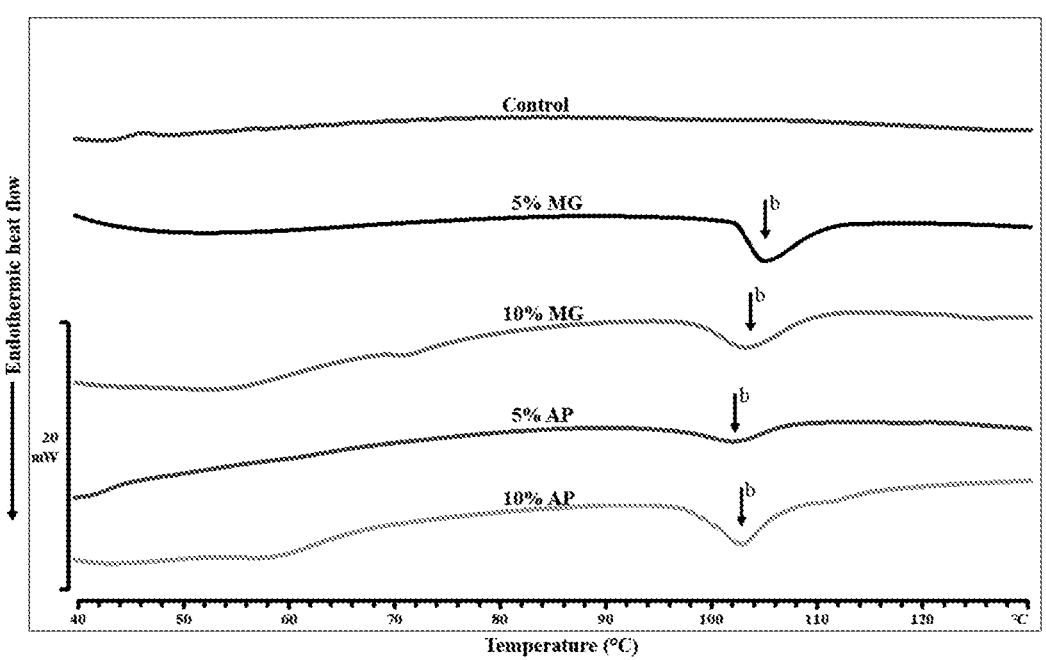
Figure 13:
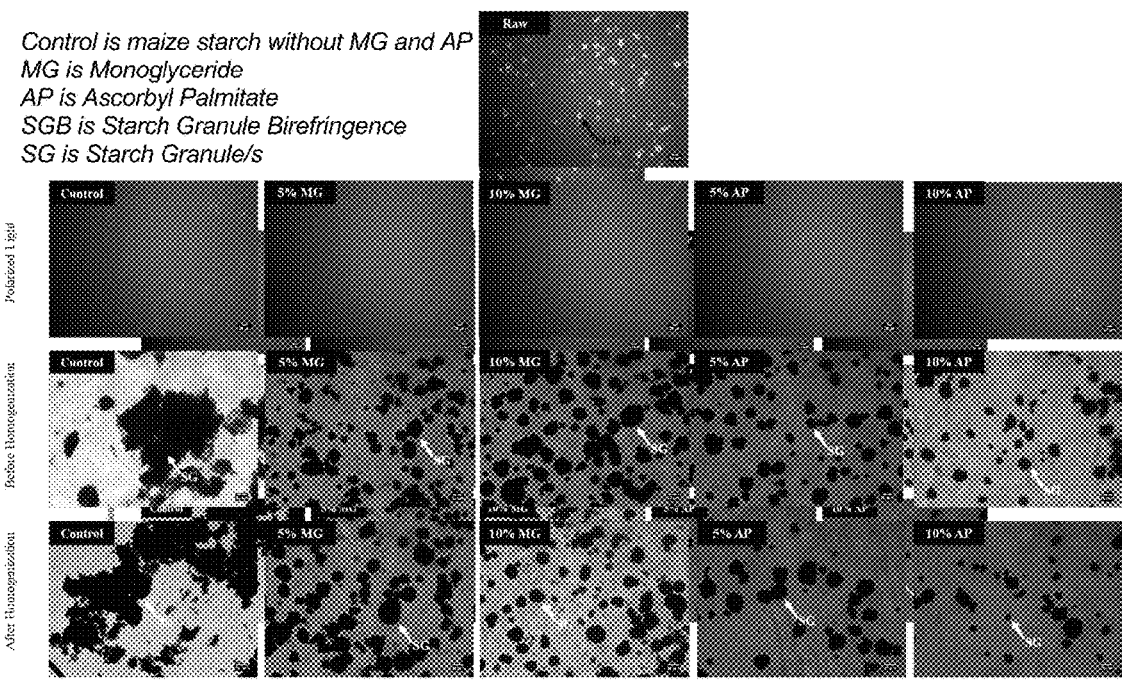
Figure 14:
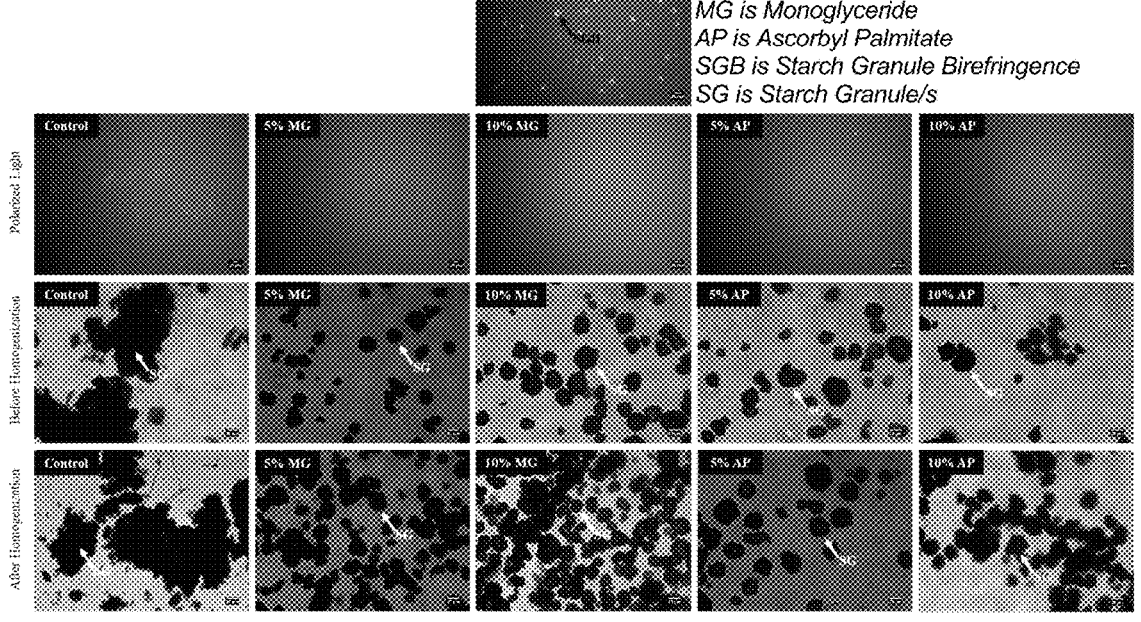
Figure 15:
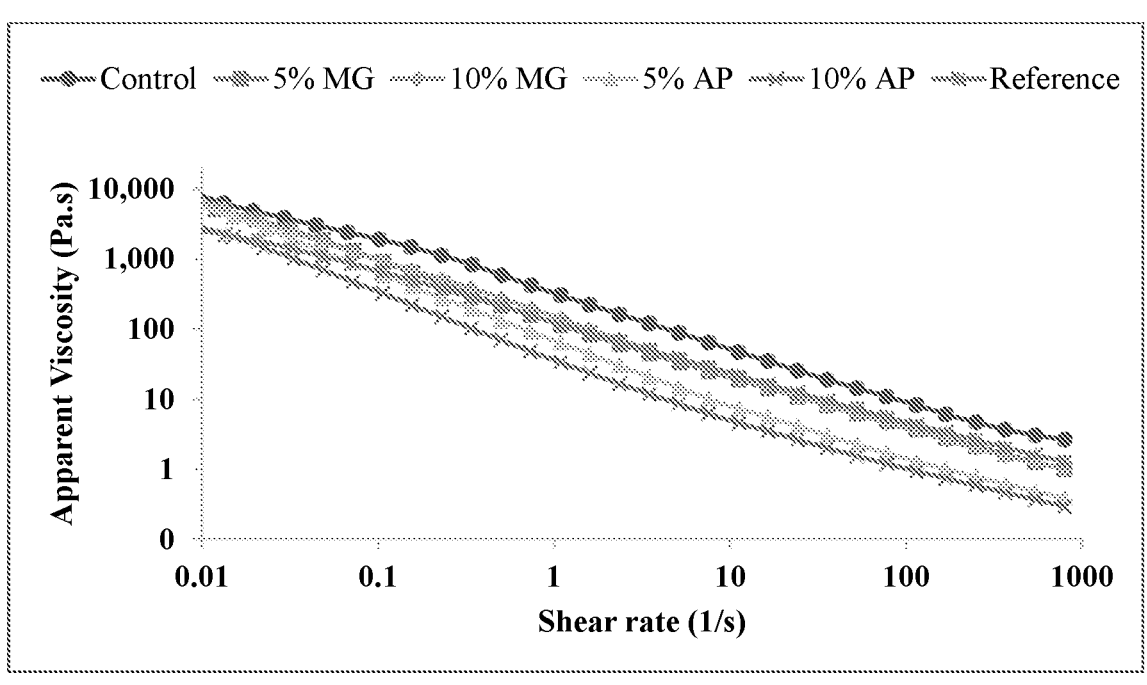
Figure 16:
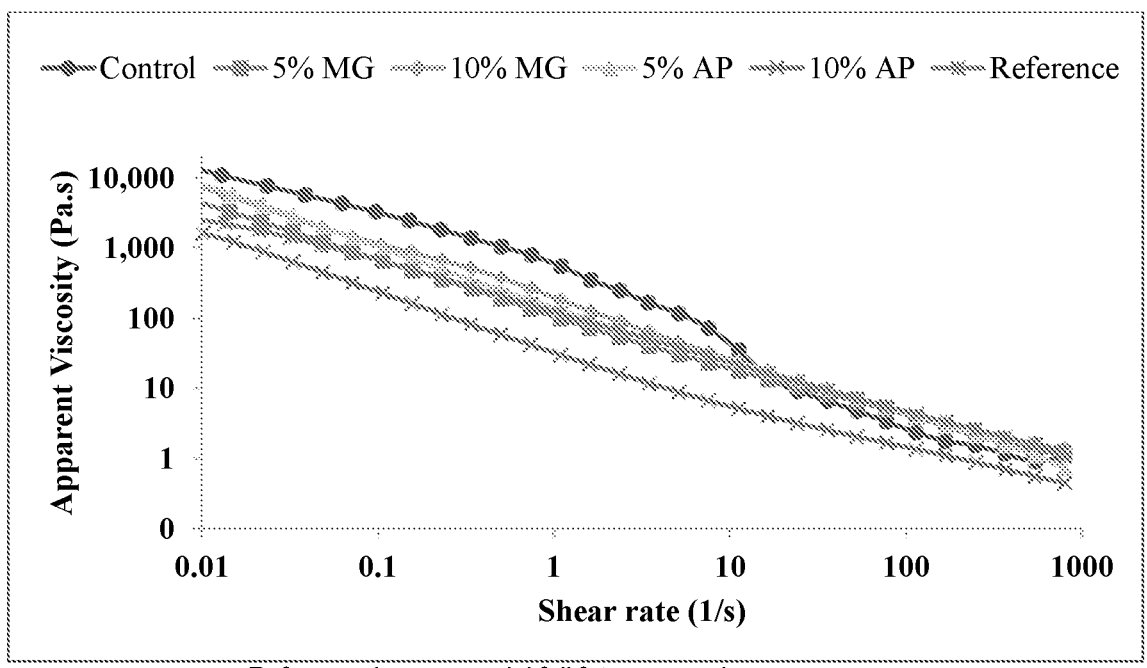
Figure 21:
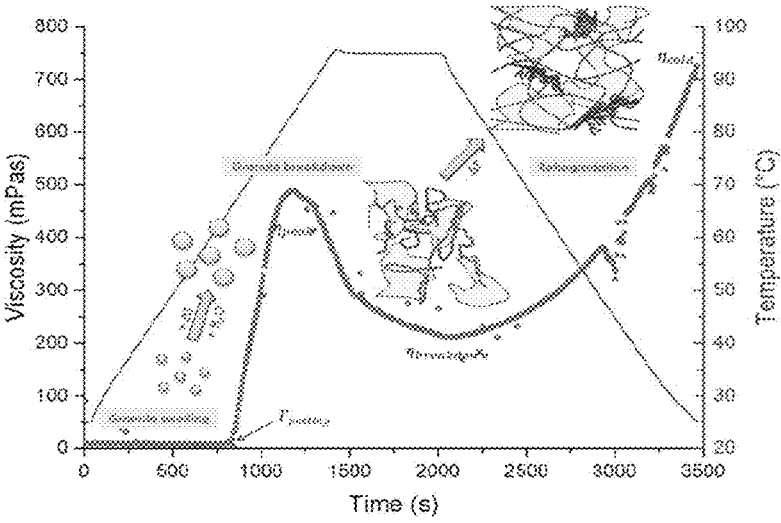
Figure 22:
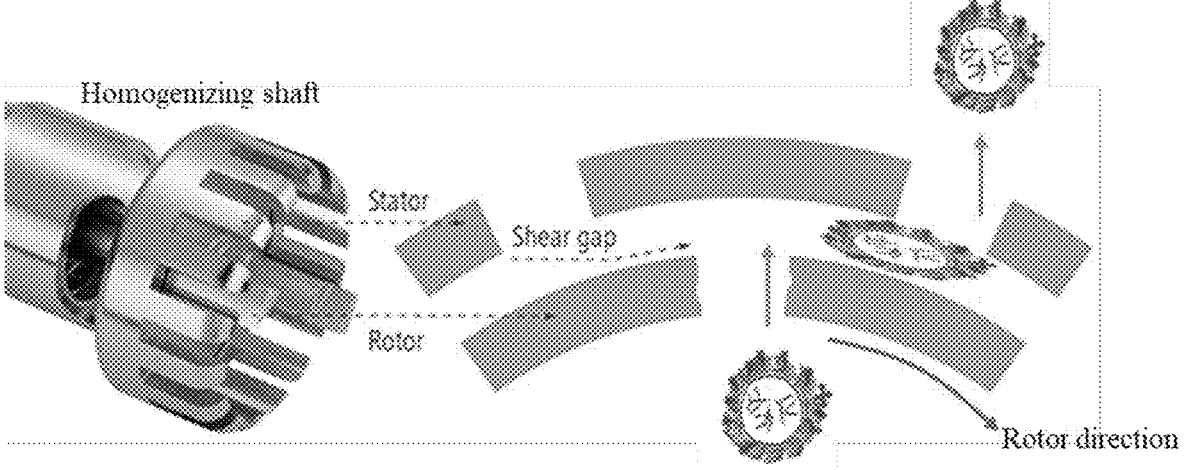
Figure 23:
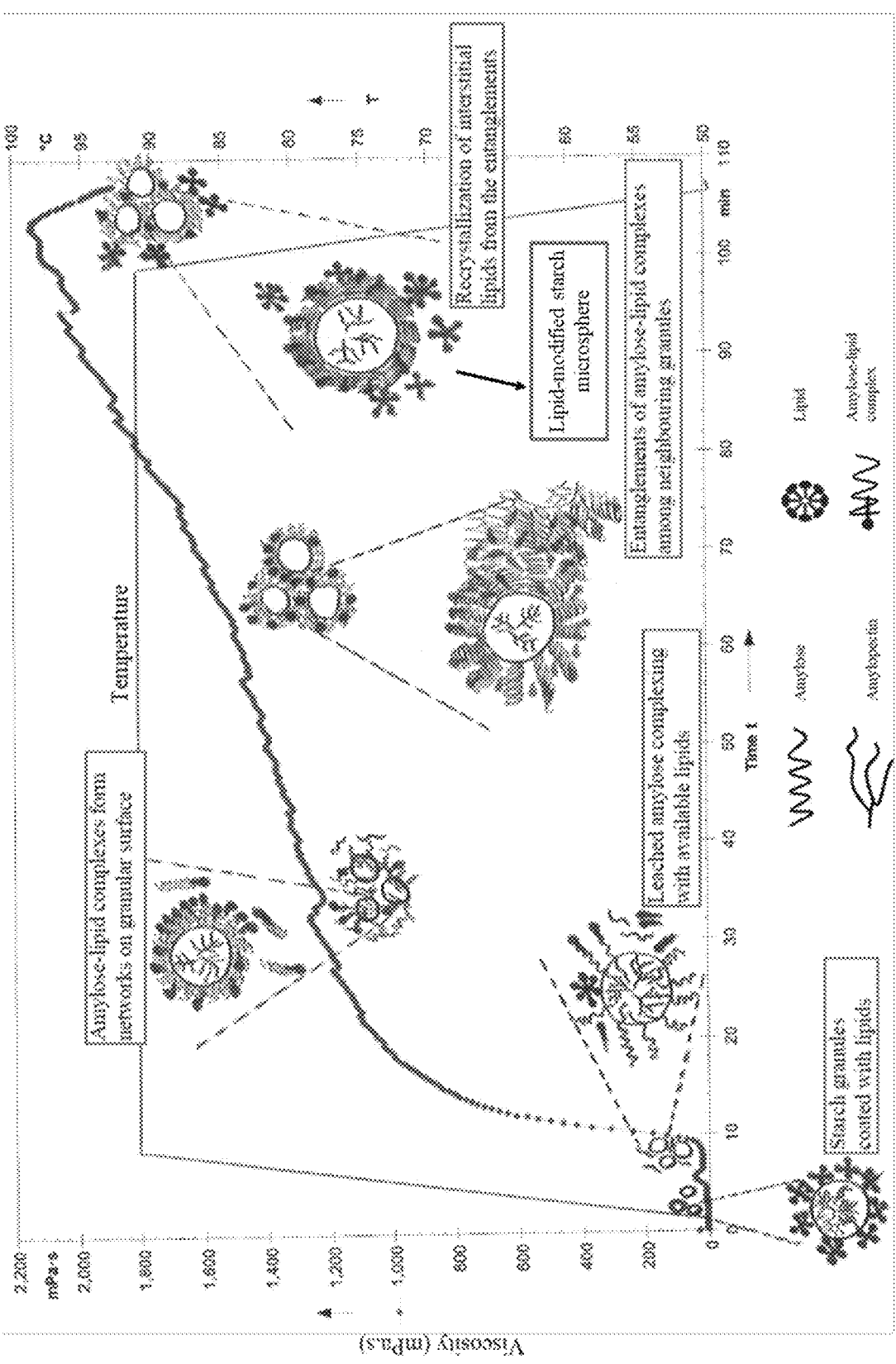

FIG. 3 shows a graph showing the effects of monoglyceride and ascorbyl palmitate on the pasting properties of maize starch during short (holding at 91° C. for 10 min) pasting conditions, FIG. 4 shows a graph showing the effects of monoglyceride and ascorbyl palmitate on the pasting properties of maize starch during extended holding at 91° C. for 90 min) pasting conditions, FIG. 5 shows a graph showing the effects of monoglyceride and ascorbyl palmitate on the flow properties of maize starch pastes after short (91° C. for 10 min) pasting;

FIG. 6 shows a graph showing the effects of homogenization on the flow properties of maize starch pastes with monoglyceride and ascorbyl palmitate after short (91° C. for 10 min) pasting;

FIG. 7 shows a graph showing the effects of monoglyceride and ascorbyl palmitate on the flow properties of maize starch pastes after extended (91° C. for 90 min) pasting;

FIG. 8 shows a graph showing the effects of homogenization on the flow properties of maize starch pastes with monoglyceride and ascorbyl palmitate after extended (91° C. for 90 min) pasting;

FIG. 9 shows a graph showing the effects of monoglyceride and ascorbyl palmitate on the thermal properties of unwashed maize starch after short (holding at 91° C. for 10 min) pasting;

FIG. 10 shows a graph showing the effects of monoglyceride and ascorbyl palmitate on the thermal properties of washed (centrifugation at 8000 rpm for 3 minutes in ethanol) maize starch after short (holding at 91° C. for 10 min) pasting;

FIG. 11 shows a graph showing the effects of monoglyceride and ascorbyl palmitate on the thermal properties of unwashed maize starch after extended (holding at 91° C. for 90 min) pasting;

FIG. 12 shows a graph showing the effects of monoglyceride and ascorbyl palmitate on the thermal properties of washed (centrifugation at 8000 rpm for 3 minutes in ethanol) maize starch after extended (91° C. for 90 min) pasting;

FIG. 13 shows the effects of pasting and homogenization on the birefringence and granular integrity of maize starch with and without monoglyceride and ascorbyl palmitate after short (91° C. for 10 min) pasting. Scale bar 20 μm;

FIG. 14 shows the effects of pasting and homogenization on the birefringence and granular integrity of maize starch with and without monoglyceride and ascorbyl palmitate after extended (91° C. for 90 min) pasting. Scale bar 20 μm;

FIG. 15 shows a graph of the effects of maize starch-lipid pastes produced by short (91° C. for 10 min) pasting on the flow properties of low-calorie mayonnaise-type emulsion at 80% oil replacement;

FIG. 16 shows a graph of the effects of maize starch-lipid pastes produced by short (91° C. for 10 min) pasting on the flow properties of low-calorie mayonnaise-type emulsion at 100% oil replacement;

FIG. 17 shows a graph of the effects of maize starch-lipid pastes produced by extended (91° C. for 90 min) pasting on the flow properties of low-calorie mayonnaise-type emulsion at 80% oil replacement;

FIG. 18 shows a graph of the effects of maize starch-lipid pastes produced by extended (91° C. for 90 min) pasting on the flow properties of low-calorie mayonnaise-type emulsion at 100% oil replacement;

FIG. 19 shows a microstructure of full-fat mayonnaise and low-calorie mayonnaise-type emulsion at 80% and 100% fat replacement using starch paste (with and without monoglyceride and ascorbyl palmitate) after short (91° C. for 10 min) pasting. Scale bar 20 μm;

FIG. 20 shows a microstructure of full-fat mayonnaise and low-calorie mayonnaise-type emulsion at 80% and 100% fat replacement using starch paste (with and without monoglyceride and ascorbyl palmitate) after extended (91° C. for 90 min) pasting. Scale bar 20 μm;

FIG. 21 shows a schematic representation of the structural changes of maize starch suspension during pasting;

FIG. 22 shows a schematic representation of the structural changes of maize starch suspension with added lipids during pasting; and FIG. 23 shows a graphic representation of the effect of homogenization on the structural integrity of lipid-modified starch microspheres.

In the figures, like reference numerals refer to like parts of the invention unless where otherwise indicated.

EMBODIMENT OF THE INVENTION

Figure 1:
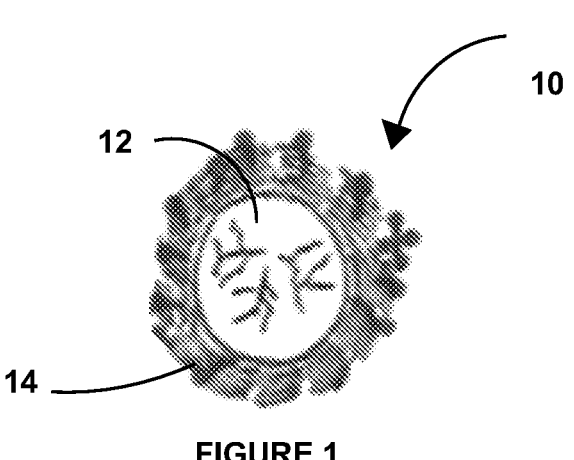
FIG. 1 shows a spherical micro-particle of the lipid-modified starch pack.

FIG. 1 shows a spherical micro-particle (10) which forms part of a lipid-modified starch paste in accordance with one aspect of the invention. The spherical micro-particle (10) has a starch core (12) with an amylose-lipid complex layer (14) on its outer surface. Advantageously, the amylose-lipid complex layer (14) regulates the water absorption capability of the starch core (12).

The spherical micro-particle (10) has a particle size of approximately 23 μm. The micro-particle (10) is deformable during homogenization, but returns to its spherical structure after homogenization.

The lipid-modified starch paste (not shown), includes a plurality of the spherical micro-particles (shown in FIG. 1), with excess lipids aligned between the plurality of spherical micro-particles. The excess lipids function as a lubricant.

The spherical geometry and stability of the lipid-modified starch microspheres (10) makes the lipid-modified starch paste suitable as a fat substitute in various foodstuffs.

Figure 2:
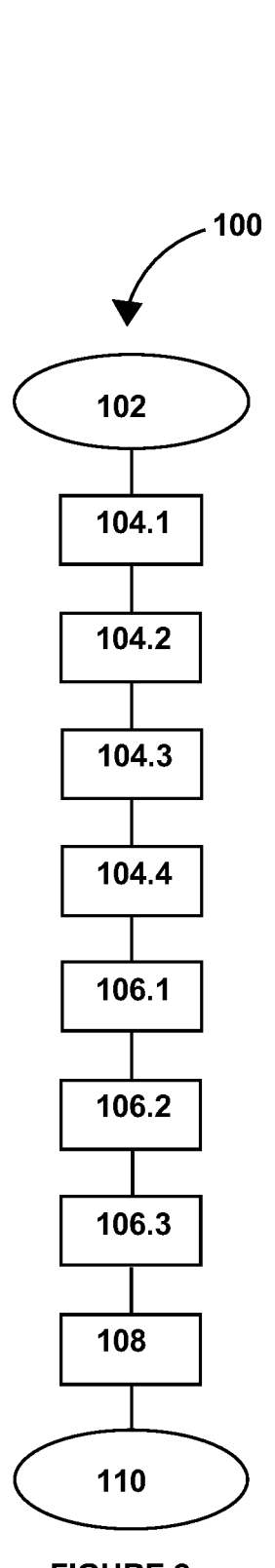
FIG. 2 shows a flow diagram of a process for preparing a lipid-modified starch paste.

FIG. 2 shows a process (100) for preparing a lipid-modified starch paste. The process (100) starts at reference numeral (102).

At (104), the starch and monoglyceride and/or ascorbyl palmitate are combined to provide a suspension. In this example, step (104) includes four sub-steps.

At (104.1), the monoglyceride and the ascorbyl palmitate are each dissolved in a solvent separately. The solvent is in the form of approximately 95% ethanol. In this example, the monoglyceride is at a concentration of approximately 5% in the monoglyceride-ethanol solution, the monoglyceride being in the form of edible grade monoglyceride, and the ascorbyl palmitate is at a concentration of approximately 10% in the ascorbyl palmitate-ethanol solution.

At (104.2), the starch, which is in the form of maize starch, is added to the monoglyceride-ethanol solution and the ascorbyl palmitate-ethanol solution respectively, to produce a slurry.

At (104.3), the slurry (whether monoglyceride- or ascorbyl palmitate-based) is mixed. Mixing the slurry (104.3) includes shaking the slurry in a shaking water bath at an increased temperature of approximately 50° C. for a predetermined amount of time of approximately 30 minutes.

At (104.4), excess ethanol is evaporated from the slurry to provide the suspension. In this example, to evaporate the excess ethanol, the slurry is heated to approximately 50° C. whilst being stirred until the majority of the visible excess solvent has evaporated. Thereafter, any remaining ethanol is evaporated in a force draught oven at a temperature of approximately 50° C. for approximately 24 hours.

At (106), the suspension is heat processed to form a lipid-modified starch paste. The heat processing step (106) is in the form of wet heat processing and includes three sub-steps.

At (106.1), the wet heat processing includes adding water to the suspension to provide a hydrated suspension. The hydration of the suspension is operable to minimize any lumping or settling of starch in subsequent sub-steps.

At (106.2), any starch which may have settled in the hydrated suspension is re-suspended by heating the hydrated solution to approximately 50° C. and holding at that temperature for approximately 10 seconds whilst stirring at a rate of approximately 960 rpm.

At (106.3), the hydrated suspension is pasted, which includes heating the hydrated suspension to a predetermined temperature above the gelatinisation temperature of starch and stirring the hydrated suspension at a predetermined stirring speed for a predetermined amount of time. This sub-step is performed in a closed system (i.e. with lid on) to minimize evaporation of water from the hydrated suspension, as over-evaporation effects the viscosity of the final lipid-modified starch paste product.

In this example, the predetermined temperature is approximately 91° C., the hydrated suspension being heated to this temperature at a rate of approximately 5.5° C. per minute. The predetermined stirring speed is approximately 160 rpm.

Importantly, in this example, the pasting of the hydrated suspension (106.3) can either be in the form of a short pasting process or an extended pasting process, these pasting processes differing only in the amount of time for pasting is occur. In the short pasting process, the predetermined amount of time is approximately 10 minutes, whilst in the extended pasting process, the predetermined amount of time is approximately 90 minutes. The viscosity of the lipid-modified starch paste is continuously monitored with a rheometer to prevent an over-viscous product.

At (108), the lipid-modified starch paste is allowed to cool to room temperature. Once cooled, the paste is available for use as a fat replacer or fat mimetic in foodstuffs.

The process for preparing a lipid-modified starch paste (100) ends at (110).

1. Materials and Methods

1.1 Materials

Native starch from yellow maize was acquired from Tongaat-Hulett Starch in Germiston. Ascorbyl palmitate was obtained from DSM Nutritional Products South Africa (Pty) Ltd in Johannesburg. The monoglyceride (Product name: Dimodan HP—Distilled Monoglyceride) was obtained from DuPont-Danisco South Africa in Cape Town and was made from edible, fully hydrogenated soybean oil with 80% purity. Egg yolk powder, product code YLKP01, was obtained from Sunspray Food Ingredients (Pty) Ltd in Bronkhorspruit. Sunflower oil, white spirit vinegar, salt and sugar were purchased from a local retailer.

1.2 Methods

1.2.1 Incorporation of Ascorbyl Palmitate/Monoglyceride

Monoglyceride and ascorbyl palmitate were each dissolved in 95% ethanol in a glass bottle at concentrations of 5% and 10% (on dry weight basis of the starch). Maize starch was added to the ethanol solution. The glass bottle with the slurry was placed in a shaking water bath at 50° C. for 30 min and the bottle lid was kept loose to prevent pressure build-up. Excess ethanol was evaporated off in the beaker on a heating stage (50° C.) with gentle stirring. The remaining ethanol was then evaporated off in a force draught oven at 50° C. for 24 hours.

1.2.2 Starch Pasting

A Physica MCR 101 Rheometer equipped with a stirrer (ST24/Q1) and a Rheoplus Software®, Anton-Paar (Graz, Austria) was utilized to measure the viscosity of the starch during heat treatment. Starch (1.6 g; on dry basis of the starch) was suspended in 16 g of distilled water. The pasting cycle began with an initial stirring of 960 rpm at 50° C. for 10 s and then 160 rpm for the entire period thereafter. The temperature was increased to 91° C. at a rate of 5.5° C./min and held at this temperature for 10 minutes (short pasting) and 90 minutes (extended pasting) to determine the pasting properties. After pasting and cooling, the flow, textural and microstructural properties of the starch pastes were measured or immersed in liquid nitrogen and freeze-dried for further analyses.

1.2.2.1 Homogenization

The starch pastes where homogenized at 50° C. (to prevent gelling of the control starch paste) for 5 min using an Ultra Turrax T25 digital with a S25KV-25 F dispensing shaft (0.5 mm gap between rotor and stator) (Janke and Kunkel IKA® Labortechnik, Staufen, Germany) at 8000 rpm. After homogenization, the starch pastes were subject to flow and microstructural analysis.

1.2.3 Preparation of Low-calorie Mayonnaise-Type Emulsion

Table 1.2-1 outlines the different low-calorie mayonnaise-type emulsion formulations. An Ultra Turrax T25 digital with a S25 KV-25 F dispensing shaft was used at 8000 rpm (5 min) as a homogenizer. The oil was added slowly during homogenization to avoid the formation of an oil layer on top of the emulsion. Oil was replaced at 80% and 100% in the low-calorie mayonnaise-type emulsion. Further analysis was conducted after 24 hours of refrigerated storage (4° C.).

TABLE 1.2-1

| Formulations of full fat mayonnaise and low-calorie mayonnaise-type emulsion | | | |
|---|---|---|---|
| | Full-fat mayonnaise | Low-calorie: 80% oil replacement | Low-calorie: 100% oil replacement |
| Sunflower oil | 80 | 16 | 0 |
| Egg yolk | 9 | 9 | 9 |
| Vinegar | 8 | 8 | 8 |
| Salt | 2 | 2 | 2 |
| Sugar | 1 | 1 | 1 |
| Starch pastes* | 0 | 64 | 80 |

*20% w/w maize starch pastes (with and without monoglyceride and ascorbyl palmitate) pasted for 10 min and 90 min was used.

1.2.4 Analyses 1.2.4.1 Flow Property Measurement

The flow properties of starch pastes before and after homogenization were measured using the plate-to-plate method with a Physica MCR 101 Rheometer with Rheoplus Software®, Anton Paar (Graz, Austria) and the vane system was used for low calorie mayonnaise-type emulsion. A serrated plate (25 mm diameter) was utilized to measure the flow properties of the starch pastes with a 1 mm gap. The starch pastes were equilibrated at 50° C. for 1 min before the start of the test. Flow properties were determined at different shear rates from 0.001 to 1000 s−1. The Power law model: $\sigma = K\dot{\gamma}^n$ where $\sigma$ is the shear stress (Pa), K is the consistency coefficient (Pa·sn), $\dot{\gamma}$ is the shear rate (s−1) and n is the flow behaviour index; where n=1 for Newtonian fluids, n<1 for shear thinning and n>1 for shear thickening materials.

1.2.4.2 Starch Gel Texture

Starch pastes with and without monoglyceride and ascorbyl palmitate were hot-filled into small, circular containers (16 mm height×37 mm diameter). The starch pastes were stored in these containers for 24 h at about 23±1° C. Gel firmness was analyzed using EZ-test texture analyzer EZ-L, Shimadzu (Tokyo, Japan) with a P/20p cylinder probe (20 mm diameter). The plunger penetrated 5 mm and retracted from the sample. The maximum force was noted. This was conducted at a pre-load force of 0.01 N and a test speed of 10 mm/min.

1.2.4.2 Starch Gel Texture

The starch powder (10 mg on dry basis) from the freeze-dried paste was mixed with distilled water (30 mg) and then equilibrated for at least 4 h at about 23±2° C. for thermal analysis with a high pressure Differential Scanning Calorimetry (DSC) system, HP DSC827e, Mettler Toledo (Greifensee, Switzerland). Scanning was done from 25 to 150° C. under pressure (4 MPa) using N2 at a rate of 10°/min. Indium (Tm=156.6° C., 28.45 J g−1) was used as a standard to calibrate the DSC and an empty aluminium pan as a reference.

1.2.4.4 Microstructural Analysis

Pasted and unpasted starch was visualized with a VS3 Series Biological Trinocular Light Microscope from Micromet Scientific with a Biowizard Image Analysis software (Delhi, India) equipped with a polarising filter lens. The starch pastes were dispersed as 10% w/w in 30% glycerol. One drop of the suspension was placed onto a specimen glass slide, covered with a glass cover slip. The structural integrity and shape of starch granules were analysed with the same light microscope without the aid of a polarising filter. To enhance the image contrast two drops of an Iodine solution was added. Images were taken with 20× objective lens at 200× magnification and evaluated with the ImageJ® software package.

Biowizard Image Analysis software was also used to manually, measure the particle size distribution of individual starch granules at 200× magnification. A minimum of 50 granules per sample were measured in diameter so as to determine the particle size distribution as a function of pasting and homogenization.

1.2.4.5 Statistical Analysis

Statistical analyses were conducted using one-way analysis of variance (ANOVA). The means from different analyses were compared at p<0.05 using Tukey Least Significant Difference test (LSD). The pasting duration and concentration of monoglyceride and ascorbyl palmitate were the independent variables of the experiment. The analyses were conducted in triplicates however only repeatable results were considered.

2. Results 2.1 Pasting Properties

Maize starch without lipids was characterised by the lowest pasting temperature and pasting time at 72.9° C. and 5.48 minutes, respectively (Table 2.1-1). The addition of either monoglyceride or ascorbyl palmitate increased the pasting temperature and pasting time. The pasting temperature of starch with monoglyceride were significantly (P<0.05) lower than their ascorbyl palmitate counterparts. Increasing the concentration from 5% (w/w of starch) to 10% (w/w of starch) of either monoglyceride or ascorbyl palmitate resulted in the further delay of the pasting time and a significant (P <0.05) increase in the pasting temperature.

The effect of lipids on the pasting properties of maize starch after short pasting are shown in FIG. 3 and Table 2.1-1. Starch without added lipids (control) showed a peak viscosity of about 2015 mPa·s during the initial 10 minutes. The peak viscosity was followed by a decrease in viscosity during holding temperature at 91° C. The peak viscosity was not detected during the first 10 minutes for starch with added lipids. Maize starch with 5% monoglyceride had the highest maximum viscosity of about 1635 mPa·s at the end of the holding period at 91° C. however it was not significantly different (P<0.05) from the control at 1595 mPa·s. Starch with 10% ascorbyl palmitate had the lowest maximum viscosity at the end of the holding period at 91° C. The viscosity of starch with 5% monoglyceride increased upon cooling to a final viscosity of about 1969 mPa·s. Starch with 10% ascorbyl palmitate had the lowest final viscosity of about 37.8 mPa·s. The pasting curves of starch with 5% and 10% ascorbyl palmitate had an increase in viscosity which was immediately followed by a decrease in viscosity corresponding to a temperature range of 78° C.-67° C. (cooling) (FIGS. 3 and 4).

The effects of lipids on the pasting properties of maize starch after extended pasting are shown in FIG. 4 and Table 2.1-1. The pasting profiles of starch with added lipids (monoglyceride and ascorbyl palmitate) were relatively 'noisy'. Starch without added lipids (control) had a peak viscosity of about 2980 mPa·s. A second peak viscosity (maximum viscosity) of about 2474 mPa·s was observed for the control during the holding period at 91° C. Peak viscosities were not detected for starches with added lipids during holding period at 91° C. Starch with 5% monoglyceride had the highest maximum viscosity of about 2768 mPa·s and starch with 10% ascorbyl palmitate had the lowest maximum viscosity of about 1325 mPa·s. The addition of lipids to starch resulted in decreased viscosities during cooling. The lowest final viscosity was observed for starch with 10% ascorbyl palmitate at about 454 mPa·s. The pasting curves of starch with 5% and 10% ascorbyl palmitate were also characterized by an increase-decrease in viscosity corresponding to a temperature range of 78° C.-67° C.

TABLE 2.1 1

Effects of monoglyceride and ascorbyl palmitate on the pasting properties
of maize starch during short (holding at 91° C. for 10 minutes) and extended (holding at
91° C. for 90 minutes) pasting times

| Treatment | | | | Short Pasting | | | Extended Pasting | | |
|---|---|---|---|---|---|---|---|---|---|
| MG (%) | AP (%) | PT (min) | PT (° C.) | PV (mPa.s) | HMV (mPa.s) | FV (mPa.s) | PV (mPa.s) | HMV (mPa.s) | FV (mPa.s) |
| 0 | 0 | $5.48^a \pm 0.07$ | $72.9^a \pm 0.39$ | 2015 ± 5 | $1595^d \pm 5$ | $1820^d \pm 10$ | 2980 ± 80 | $2474^c \pm 130$ | $2886^a \pm 53$ |
| 5 | 0 | $8.06^b \pm 0.07$ | $87.2^b \pm 0.39$ | ND | $1635^d \pm 35$ | $1969^e \pm 22$ | ND | $2768^d \pm 78$ | $2488^d \pm 0.0$ |
| 10 | 0 | $8.51^d \pm 0.08$ | $89.7^d \pm 0.37$ | ND | $676^b \pm 2.5$ | $577^c \pm 48$ | ND | $2038^d \pm 7$ | $1861^c \pm 64$ |
| 0 | 5 | $8.32^c \pm 0.00$ | $88.6^c \pm 0.02$ | ND | $837.0^c \pm 12$ | $98.0^b \pm 15$ | ND | $2012^b \pm 0.9$ | $1143^b \pm 1.9$ |
| 0 | 10 | $8.67^d \pm 0.07$ | $90.1^e \pm 0.38$ | ND | $118^a \pm 6.0$ | $38.0^a \pm 15$ | ND | $1325^a \pm 12$ | $454^a \pm 8.0$ |

Means with different superscripts differ signifcantly (P < 0.05), means were compared within their pastingconditions
Control is maize starch without monoglyceride and ascorbyl palmitate
MG is Monoglyceride (5% & 10% w/w of starch)
AP is Ascorbyl Palmitate (5% & 10% w/w of starch)
ND is Not DetectedPT (mm) is the Pasting time and PT (° C.) is the Pasting temperature
PV is the Peak viscosity, HMV is the Holding maximum viscosity at 91° C. and FV is the final viscosity

2.2 Flow Properties

The experimental data of starch pastes with added lipids showed a good fit to the Power Law Model as the coefficient of determination (R2) had an average of 0.88. The zero shear viscosity was obtained in the linear region of the apparent viscosity vs shear rate curves at low shear rates.

The effects of lipids and homogenization on the flow properties of starch paste for short (91° C. for 10 minutes) pasting are presented in FIG. 5, 6 and Table 2.2-1. The shear thinning of maize starch control occurred mostly after 0.1 s−1 for short pasting after homogenization, and for extended pasting. The flow behaviour index (n) of maize starch pastes with and without lipids was not significantly (P>0.05) affected by homogenization. Homogenization reduced the zero-shear viscosities of starch pastes with and without lipids. Starch with 5% monoglyceride had the highest zero-shear viscosity of about 6273 Pa·s. The highest consistency coefficient (K-value) of 112 Pa·sn was also observed for starch paste with 5% monoglyceride. Homogenization did not significantly (P>0.05) affect the K-values of maize starch pastes with 10% monoglyceride and 10% ascorbyl palmitate however the K-values of starch paste without monoglyceride and ascorbyl palmitate (control), 5% monoglyceride and 5% ascorbyl palmitate were significantly (P<0.05) reduced.

The effects of homogenization on the flow properties of lipid-modified starch pastes for extended (91° C. for 90 minutes) pasting are presented in FIG. 7, 8 and Table 2.2-1. The zero-shear viscosities of starch pastes without lipids were significantly (P<0.05) reduced by homogenization. It seems that the viscosity curves for starch modified with lipids did not show a proper zero shear viscosity (within the measured shear rates) since the viscosity started decreasing at low shear rates (0.001 s−1) (results not shown). Starch paste without lipids (control) constituted the highest K-values before and after homogenization with values of 262 Pa·sn and 175 Pa·sn, respectively. Starch paste with 10% monoglyceride had the highest zero-shear viscosity of about 22230 Pa·s which was reduced to 6317 Pa·s upon homogenization. The lowest K-value was observed for starch paste with 5% ascorbyl palmitate and it remained statistically unchanged after homogenization. The flow behaviour index (n-value) of starch paste with 5% monoglyceride, 10% monoglyceride and 10% ascorbyl palmitate were statistically similar (P>0.05) before and after homogenization.

TABLE 2.2 1

Effects of homogenization on the consistency coefficient (K) (Pa.sn) and
n-values (Flow behaviour index) of maize starch pastes with monoglyceride and ascorbyl
palmitate after short (91° C. for 10 minutes) and extended (91° C. for 90 minutes) pasting
conditions

| | Sample | | Short Pasting | | | Extended Pasting | | |
|---|---|---|---|---|---|---|---|---|
| | MG (%) | AP (%) | Zero Shear Viscosity (Pa.s) | K-value (Pa.sn) | n-value | Zero Shear Viscosity (Pa.s) | K-value (Pa.sn) | n-value |
| Before homogenization | 0 | 0 | $5034^i \pm 47$ | $84.7^d \pm 4.9$ | $0.19^c \pm 0.02$ | $2410^b \pm 2.7$ | $262^g \pm 7.7$ | $0.10^a \pm 0.00$ |
| | 5 | 0 | $6273^j \pm 108$ | $112^e \pm 8.5$ | $0.15^b \pm 0.02$ | $12774^h \pm 231$ | $90.2^d \pm 6.8$ | $0.13^{bc} \pm 0.00$ |
| | 10 | 0 | $4900^h \pm 6.36$ | $39.5^b \pm 6.7$ | $0.22^c \pm 0.01$ | $22230^i \pm 188$ | $133^e \pm 3.8$ | $0.10^a \pm 0.00$ |
| | 0 | 5 | $2143^e \pm 0.71$ | $39.4^b \pm 0.0$ | $0.13^{ab} \pm 0.01$ | $6525^d \pm 108$ | $63.9^b \pm 2.3$ | $0.14^c \pm 0.01$ |
| | 0 | 10 | $3103^g \pm 87.0$ | $27.5^a \pm 0.14$ | $0.10^a \pm 0.00$ | $7797^f \pm 40$ | $75.4^c \pm 2.1$ | $0.11^{ab} \pm 0.01$ |
| After homogenization | 0 | 0 | $467.3^a \pm 12$ | $75.8^c \pm 4.5$ | $0.19^c \pm 0.01$ | $947^a \pm 17$ | $175^f \pm 4.9$ | $0.14^c \pm 0.01$ |
| | 5 | 0 | $1515^c \pm 5.66$ | $28.1^a \pm 5.4$ | $0.12^{ab} \pm 0.01$ | $10420^g \pm 185$ | $65.4^{bc} \pm 5.9$ | $0.15^c \pm 0.02$ |
| | 10 | 0 | $2910^f \pm 48.1$ | $39.1^b \pm 2.1$ | $0.20^c \pm 0.00$ | $6317^d \pm 61$ | $56.8a^b \pm 2.1$ | $0.11^a \pm 0.01$ |
| | 0 | 5 | $1978^d \pm 14.1$ | $27.3^a \pm 2.0$ | $0.10^a \pm 0.00$ | $7412^e \pm 30$ | $62.0^b \pm 4.3$ | $0.10^a \pm 0.00$ |
| | 0 | 10 | $999^b \pm 11.3$ | $21.8^a \pm 0.5$ | $0.10^a \pm 0.00$ | $4311^c \pm 30$ | $46.9^a \pm 1.0$ | $0.10^a \pm 0.00$ |

Means with different superscripts differ significantly (P < 0.05)
Control is maize starch without monoglyceride and ascorbyl palmitate
MG is Monoglyceride (5% & 10% w/w of starch)
AP is Ascorbyl Palmitate (5% & 10% w/w of starch)
Homogenization was at 8000 rpm for 5 minutes

2.3 Thermal Properties

The effects of monoglyceride and ascorbyl palmitate on the thermal properties of starch after short pasting are presented in FIG. 9 and Table 2.3-1. Maize starch without lipids (control) did not exhibit endotherm peaks for both short (91° C. for 10 min) and extended (91° C. for 90 min) pasting conditions. Maize starch with monoglyceride and ascorbyl palmitate exhibited endothermal peaks below 70° C. which are consistent with the melting temperature of either lipid. The endothermal peaks below 70° C. in starch with lipids were removed by washing (centrifugation at 8000 rpm for 3 minutes in absolute ethanol). Maize starch with monoglyceride and ascorbyl palmitate were characterised by a single additional melting peaks ("b") with similar onset temperatures (To). There was no significant difference (P>0.05) in the heat flow for maize starch with monoglyceride and ascorbyl palmitate. FIG. 10 and Table 2.3-1 displays the effect of monoglyceride and ascorbyl palmitate on maize starch after short pasting and washing. The heat flow (ΔH) of maize starches with monoglyceride and ascorbyl palmitate significantly (P<0.05) increased after washing however the melting temperatures were not significantly different.

FIG. 11 and Table 2.3-1 shows the effect of lipids on the thermal properties of starch after extended pasting. Maize starch with 5% monoglyceride had two additional endotherms with temperature range from 103.9-109.9° C. ("b") and 112.8-121.5° C. ("c"). Maize starch with ascorbyl palmitate had significantly higher heat flow (ΔH) as compared to their monoglyceride counterparts. The starch treatments with either 10% monoglyceride or 5 and 10% ascorbyl palmitate resulted in a single endothermal peak ("b") after extended pasting.

FIG. 12 and Table 2.3-1 displays the effect of monoglyceride and ascorbyl palmitate on maize starch after extended pasting followed by washing with ethanol. The two endotherms with peak temperatures of about 105° C. and 116° C. were observed for maize starch with 5% monoglyceride after washing. An insignificant (P>0.05) increase was observed in the heat flow (ΔH) of maize starch with ascorbyl palmitate after washing, however, significant (P<0.05) increase was noted for maize starch with monoglyceride. The combined heat flow ("b" and "c") for maize starch with 5% monoglyceride was increased by almost 50%, from the unwashed ΔH of 5.4 J/g ("b"=2.14 J/g and "c"=3.26 J/g) to 9.63 J/g ("b"=5.04 J/g and "c"=4.59 J/g) for washed with ethanol.

TABLE 2.3 1

Effects of monoglyceride and abcorbyl palmitate on the thermal properties
of maize starch during short (91° C. for 10 minutes) and extended (91° C. for 10 minutes) pasting

| | Treatments | | Short Pasting | | | | Extended Pasting | | | |
|---|---|---|---|---|---|---|---|---|---|---|
| | MG (%) | AP (%) | To (° C.) | Tp (° C.) | Tc (° C.) | ΔH (J/g) | To (° C.) | To (° C.) | To (° C.) | ΔH (J/g) |
| Unwashed | 0 | 0 | ND | ND | ND | ND | ND | ND | ND | ND |
| | 5 | 0 | $99.2^a \pm 0.9$ | $106.5^d \pm 0.4$ | $110.1^d \pm 0.5$ | $4.5^a \pm 0.6$ | $103.9^d \pm 0.1$ | $106.2^e \pm 0.1$ | $109.9^b \pm 0.7$ | $2.14^a \pm 0.1$ |
| | | | | | | | $112.8^e \pm 0.9$ | $116.8^d \pm 1.1$ | $121.5^{cd} \pm 0.9$ | $3.26^{abc} \pm 0.4$ |
| | 10 | 0 | $99.8^a \pm 0.6$ | $102.5^{abc} \pm 0.7$ | $106.5^{abc} \pm 0.5$ | $4.4^a \pm 0.8$ | $96.7^a \pm 0.1$ | $102.8^{ab} \pm 0.5$ | $109.5^b \pm 1.4$ | $3.03^{ab} \pm 0.1$ |
| | 0 | 5 | $98.8^a \pm 0.4$ | $105.1^{cd} \pm 0.1$ | $110.0^d \pm 0.5$ | $4.4^a \pm 0.7$ | $98.6^{bc} \pm 0.3$ | $105.0^{bc} \pm 1.0$ | $109.8^b \pm 0.5$ | $6.14^{fg} \pm 0.3$ |
| | 0 | 10 | $98.3^a \pm 0.9$ | $104.2^{bcd} \pm 2.0$ | $108.0^{abcd} \pm 0.5$ | $4.8^a \pm 0.3$ | $98.3^{bc} \pm 0.7$ | $101.9^a \pm 0.2$ | $106.0^a \pm 0.6$ | $5.48^{def} \pm 0.2$ |
| Washed | 0 | 0 | ND | ND | ND | ND | ND | ND | ND | ND |
| | 5 | 0 | $99.1^a \pm 0.6$ | $104.9^{abcd} \pm 0.6$ | $109.3^{cd} \pm 0.5$ | $8.9^a \pm 08$ | $100.0^c \pm 0.6$ | $106.1^c \pm 0.2$ | $110.4^b \pm 0.4$ | $5.04^{def} \pm 0.3$ |
| | | | | | | | $114.7^e \pm 0.4$ | $116.8^d \pm 1.1$ | $124.3^d \pm 0.6$ | $4.59^{cde} \pm 0.9$ |
| | 10 | 0 | $97.7^a \pm 0.3$ | $102.5^{abc} \pm 0.3$ | $109.2^{bcd} \pm 0.5$ | $9.1^a \pm 0.2$ | $97.4^{ab} \pm 0.2$ | $102.8^{ab} \pm 0.5$ | $107.4^{ab} \pm 0.7$ | $4.77^{def} \pm 0.1$ |
| | 0 | 5 | $98.2^a \pm 0.2$ | $101.1^a \pm 0.2$ | $105.8^a \pm 0.5$ | $8.0^a \pm 0.7$ | $100.3^c \pm 1.4$ | $105.0^{bc} \pm 0.9$ | $109.7^b \pm 0.4$ | $7.04^g \pm 0.6$ |
| | 0 | 10 | $98.2^a \pm 0.8$ | $101.6^{ab} \pm 0.2$ | $106.3^{ab} \pm 0.5$ | $8.2^a \pm 0.4$ | $99.0^c \pm 0.0$ | $101.9^a \pm 0.2$ | $107.8^{ab} \pm 1.2$ | $5.98^{efg} \pm 0.3$ |

Means with different superscripts differ significantly (P < 0/05), means were compared within their respetive pasting profiles
Contro; is maze starch without MG and AP,
MG is Monoglyceride (5% and 10% w/w of starch)
AP is Ascorbyl Palmitate (5% and 10% w/w of starch)
To is the onset temperature, Tc is the conclusion temperature and Tp is the peak temperature
ND is No Detection
ΔH is the heat flow

2.4 Textual Properties

Table 2.4-1 shows the textural properties of maize starch with and without lipids (monoglyceride and ascorbyl palmitate) after pasting (short pasting with a holding time of 10 minutes at 91° C. and extended pasting with a holding time of 90 minutes at 91° C.) and storage for 24 hours at room temperature (±23° C.). Maize starch paste without lipids (control) had a gel-like texture. Maize starch with either monoglyceride or ascorbyl palmitate were characterized by a thick viscous paste. Higher firmness was recorded for the controls after extended pasting (3.13 N) and short (1.95 N) pasting conditions. There was no significant difference (P<0.05) in the firmness for short pasted maize starch with either monoglyceride or ascorbyl palmitate. Extended pasting resulted in an increase in the firmness of maize starch gel/paste with or without lipids. The maize starch paste with 10% monoglyceride after extended pasting had the lowest firmness of 0.26 N.

TABLE 2.4 1

Effects of monoglyceride and ascorbyl palmitate on the visual perception
and firmness of maize starch paste after short (91° C. for 10 minutes) and extended (91° C.
for 90 minutes) pasting

| | | Short Pasting | | Extended Pasting | |
| | | | Visual | | Visual |
| MG %) | AP (%) | Firmness (N) | Perception | Firmness (N) | Perception |
|---|---|---|---|---|---|
| 0 | 0 | 1.95$^b$ ± 0.04 | Gel | 3.13$^c$ ± 0.16 | Gel |
| 5 | 0 | 0.15$^a$ ± 0.01 | Paste | 0.39$^b$ ± 0.02 | Paste |
| 10 | 0 | 0.13$^a$ ± 0.01 | Paste | 0.26$^a$ ± 0.03 | Paste |
| 0 | 5 | 0.14$^a$ ± 0.003 | Paste | 0.32$^b$ ± 0.03 | Paste |
| 0 | 10 | 0.12$^a$ ± 0.06 | Paste | 0.33$^b$ ± 0.04 | Paste |

Means with different superscripts differ significantly (P < 0.05) and compared between short and extended pasting
Control is starch without monoglyceride and ascorbyl palmitate
MG is Monoglyceride (5% and 10% w/w of starch)
AP is Ascorbyl Palmitate (5% and 10% w/w of starch)

2.5 Microstructure

FIGS. 13 and 14 depict the effect of pasting and homogenization on the birefringence and granular integrity of starch with and without lipids (monoglyceride and ascorbyl palmitate) after short (91° C. for 10 minutes) and extended (91° C. for 90 minutes) pasting.

Starch granule exhibited birefringence cross (Maltese cross) when viewed under polarized light in its raw form (FIGS. 13 and 14). Birefringence cross was absent in starch with or without lipids after short and extended pasting. Maize starch granules with added lipids retained their structural integrity under pasting and homogenization conditions. Masses of aggregated remnant starch granules were observed before and after homogenization for starch paste without added lipids (control) after both short and extended pasting conditions. This suggest that the starch granules were disintegrated. Maize starch pastes with either monoglyceride and ascorbyl palmitate displayed rounded intact granules with less aggregation as compared to the control after short and extended pasting. Homogenization seemed to further break down the structure of granules for control however limited break down was noticeable for maize starch paste with added lipids (FIGS. 13 and 14).

Table 2.5-1 shows the granular size distribution of maize starch with and without monoglyceride and ascorbyl palmitate after pasting and homogenization. Raw starch had a lowest mean size distribution of about 12.8 μm. The mean size granular distribution of maize starch without either monoglyceride or ascorbyl palmitate was not considered since the granules appeared as large masses/clusters and not as individual granules. The starch granules with added lipids were larger after extended pasting than their short pasting counterparts. Mean size distribution of granules increased after homogenization for both short and extended pasting durations.

TABLE 2.5 1

The effects monoglyceride and ascorbyl palmitate on the starch
granular size distribution after pasting and homogenization

| | | Short pasting | | Extended pasting | |
| | | After pasting | After homogen-ization | After pasting | After homogen-ization |
| Treatment | | | | | |
| MG (%) | AP (%) | (μm) | (μm) | (μm) | (μm) |
|---|---|---|---|---|---|
| 0 | 0 | — | — | — | — |
| 5 | 0 | 21.9 ± 03.7 | 26.2 ± 04.4 | 23.7 ± 04.9 | 27.0 ± 05.4 |
| 10 | 0 | 21.2 ± 04.3 | 21.8 ± 03.9 | 23.9 ± 05.0 | 24.8 ± 06.4 |
| 0 | 5 | 22.5 ± 04.9 | 23.6 ± 05.4 | 26.5 ± 04.7 | 28.2 ± 06.4 |
| 0 | 10 | 18.0 ± 04.9 | 19.5 ± 05.2 | 23.5 ± 06.0 | 25.3 ± 05.8 |
| Raw | starch | | 12.8 ± 03.5 | | |

Control is starch without monoglyceride and ascorbyl palmitate
MG is Monoglyceride (5% and 10% w/w of starch) & AP is Ascorbyl Palmitate (5% and 10% w/w of starch)
'—' denotes the abscence of individual granules
Short (91° C. for 10 min) and extended (91° C. for 90 min) pasting
Homogenization was at 8000 rpm for 5 min 2.6 Flow Properties of Low-calorie Mayonnaise-Type Emulsion Low-calorie mayonnaise-type emulsions were prepared by replacing 80% and 100% of the oil in mayonnaise with maize starch pastes. The prepared low-calorie mayonnaise-type emulsion did not show phase separation after a 24 hour storage at 5° C. ±1. Full-fat mayonnaise was used as a reference sample. FIGS. 15 and 16 (Table 2.6-1) show the effect of 80% and 100% oil replacement on the flow properties of low-calorie mayonnaise-type emulsion with starch paste containing lipids after short (91° C. for 10 minutes) pasting. The increase in shear resulted in the decrease in viscosity of the low-calorie mayonnaise-type emulsion and full-fat mayonnaise hence a shear thinning behaviour. At 80% oil replacement, low-calorie mayonnaise-type emulsion with unmodified starch had the highest viscosity (1958 Pa·s, 293.5 Pa·s and 14.4 Pa·s) and low-calorie mayonnaise-type emulsion with 10% ascorbyl palmitate the lowest viscosity (315.3 Pa·s, 31.3 Pa·s and 1.50 Pa·s) at a shear rate of 0.1 s−1, 1 s−1 and 50 s−1, respectively (Table 5.6-1). There was no significant difference (P>0.05) in the apparent viscosity of low-calorie mayonnaise-type emulsion with 5% ascorbyl palmitate and full-fat mayonnaise at a shear rate of 0.1 s−1 (Table 2.6-1).

The increase of starch paste from 80% to 100% resulted in increase in apparent viscosity across all the low-calorie mayonnaise-type emulsions. At 100% oil replacement, the low-calorie mayonnaise-type emulsion with unmodified starch paste and that with 10% ascorbyl palmitate also showed highest (2528 Pa·s) and lowest (314.6 Pa·s) viscosity, respectively at a shear rate of 0.1 s−1. There was no significant difference (P>0.05) in the viscosity between low-calorie mayonnaise-type emulsion with 5% monoglyceride and full-fat mayonnaise at 0.1 s−1. At a shear rate of 50 s−1 (100% oil replacement), there was no significant difference (P>0.05) in the viscosity among low-calorie mayonnaise-type emulsion (unmodified starch, 5% ascorbyl palmitate, 5% and 10% monoglyceride) and full-fat.

FIGS. 17 and 18 (Table 2.6-1) show the effect of 80% and 100% oil replacement on the flow properties of low-calorie mayonnaise-type emulsion with starch modified with lipid produced by extended (91° C. for 90 minutes) pasting. Low-calorie mayonnaise-type emulsion with unmodified starch and full-fat mayonnaise were characterised by highest and lowest viscosities (80% oil replacement) of 3952 Pa·s and 694.4 Pa·s, respectively, at a shear rate of 0.1 s−1. At a shear rate of 50 s−1, the viscosity of full-fat mayonnaise and low-calorie mayonnaise-type emulsion with starch modified with 5% and 10% monoglyceride, were statistically similar at 80% oil replacement. The viscosity of low-calorie mayonnaise-type emulsion with unmodified starch at 100% oil replacement was the highest across the three shear rates of 0.1 s−1, 1 s−1 and 50 s−1 with values of about 5979 Pa·s, 1160 Pa·s and 40.9 Pa·s, respectively. Full-fat mayonnaise had the lowest viscosity at 0.1 s−1 (694.4 Pa·s) and 1 s−1 (120.8 Pa·s) but at 50 s−1 it was similar to the low-calorie mayonnaise-type emulsion with 10% monoglyceride and 10% ascorbyl palmitate.

structures with irregular remnant starch granules. Low-calorie mayonnaise-type emulsion with 5% and 10% monoglyceride had fat droplets that were larger and more distinguishable when compared to full-fat mayonnaise. Densely packed starch granules were observed for low-calorie mayonnaise-type emulsion with monoglyceride and ascorbyl palmitate at 100% fat replacement for short pasting however after extended pasting the starch granules were fewer and sparsely distributed (FIGS. 19 and 20).

3. Discussion

This presents a critical review of the methodology used in this research project, discusses the interaction between starch and lipids (monoglyceride and ascorbyl palmitate) and outlines the potential of lipid-modified starch as fat replacers in low calorie mayonnaise type emulsion (LCMTE).

3.1 Review of Methodology 3.1.1 The Incorporation of Monoglyceride and Ascorbyl Palmitate Monoglyceride and ascorbyl palmitate were each prepared by dissolving in absolute ethanol. The starch was added to the monoglyceride/ascorbyl palmitate-ethanol solution and placed in a shaking water bath at 50° C. for 30 min. In this study, a yellowish layer was observed on of the dried starch after evaporating the ethanol. Therefore, excess ethanol was evaporated off by placing the starch-lipid-ethanol solution in an open beaker (constant stirring) in the fume hood before oven drying. It has been found that certain dyes (Huber and BeMiller, 2000) may penetrate the starch granules via the pores.

TABLE 2.6 1

Effect of maize starch-lipid pastes produced by short (91° C. for 10 minutes) and extended (91° C. for 10 minutes) pasting on the viscosity (at different shear rates—0.1, 1.0 and 50 s-1) of low-calorie mayonnaise-type emulsion at 80% and 100% oil replacement

| | Treatments | | Short Pasting | | | Extended Pasting | | |
|---|---|---|---|---|---|---|---|---|
| | MG (%) | AP (%) | 0.1 (s⁻¹) | 1 (s⁻¹) | 50 (s⁻¹) | 0.1 (s⁻¹) | 1 (s⁻¹) | 50 (s⁻¹) |
| 80% Oil Replacement | 0 | 0 | 1958d ± 61 | 293.5e ± 8.5 | 144f ± 0.05 | 3592e ± 38 | 680.5d ± 15 | 518b ± 0.80 |
| | 5 | 0 | 948.1c ± 38 | 118.6c ± 4.4 | 6.29d ± 0.03 | 1733c ± 64 | 185.5b ± 7.3 | 7.62c ± 0.41 |
| | 10 | 0 | 900.5c ± 17 | 144.0d ± 4.3 | 5.92c ± 0.14 | 2082d ± 27 | 234.6c ± 6.6 | 8.07c ± 0.33 |
| | 0 | 5 | 611.0b ± 21 | 65.75b ± 3.2 | 2.06b ± 0.18 | 893.3b ± 10 | 99.00a ± 4.9 | 2.18a ± 0.17 |
| | 0 | 10 | 315.3a ± 6.7 | 31.30a ± 1.9 | 1.50a ± 0.04 | 956.1b ± 4.8 | 106.2a ± 2.9 | 1.08a ± 0.10 |
| | FF | | 694.4b ± 39 | 120.8c ± 3.8 | 7.28e ± 0.05 | 694.4a ± 39 | 120.8a ± 3.8 | 7.28c ± 0.05 |
| 100% Oil Replacement | 0 | 0 | 2528e ± 70 | 369.0d ± 17 | 6.27b ± 0.86 | 5979e ± 98 | 1160c ± 4.9 | 40.9d ± 1.05 |
| | 5 | 0 | 633.5b ± 17 | 101.6b ± 2.0 | 6.48b ± 0.03 | 2188d ± 73 | 252.6b ± 5.9 | 4.81a ± 0.60 |
| | 10 | 0 | 1174d ± 59 | 177.4c ± 6.1 | 6.89b ± 0.11 | 1807c ± 11 | 215.5b ± 2.1 | 7.73bc ± 0.02 |
| | 0 | 5 | 970.8c ± 16 | 124.2b ± 5.6 | 7.08b ± 0.31 | 1650bc ± 27 | 191.8ab ± 4.3 | 9.60c ± 0.40 |
| | 0 | 10 | 314.6a ± 6.0 | 37.20a ± 1.8 | 1.78a ± 0.30 | 1467b ± 10 | 167.0ab ± 1.0 | 7.48b ± 0.31 |
| | FF | | 694.4b ± 39 | 120.8b ± 3.8 | 7.28b ± 0.05 | 694.4a ± 39 | 120.8a ± 3.8 | 7.28b ± 0.05 |

FF is full-fat mayonnaise and Control is Low-calorie mayonnaise-type emulsion without MG and AP
MG is Low-calorie mayonnaise-type emulsion with Monoglyceride (5% & 10% w/w of starch)
AP is Low-calorie mayonnaise-type emulsion with Ascorbyl Palmitate (5% & 10% w/w of starch)

Means with different superscripts differ significantly (P<0.05) and means were compared within their pasting profile and oil replacement percentage (80% and 100%)

2.7 The Microstructure of Low-calorie Mayonnaise-Type Emulsion

FIGS. 19 and 20 illustrate the microstructure of full-fat mayonnaise and low-calorie mayonnaise-type emulsion with or without starch modified with monoglyceride and ascorbyl palmitate. Full-fat mayonnaise was characterised by minute, closely packed fat droplets that were uniformly distributed. Low-calorie mayonnaise-type emulsion with unmodified starch paste at 80% oil replacement had discrete 3.1.2 Pasting Flow Properties Rheological properties describe the behaviour of materials subjected to shear and deformation. The fundamental feature of starch rheology is its viscous behaviour during heat processing and gelling/non-gelling ability during cooling. The Rheometer with a cup and stirrer (measuring system) records the viscosity changes within a starch suspension/paste as a result of heating, under stirring conditions and in the presence of water. The starch was added to the water to minimize lumping (results in sample variability) and settling of starch at the bottom of the stainless steel cup. The stirrer was then used to constantly stir the starch suspension. The stirrer blades are designed to reduce settling of the starch however only repeatable data was taken into consideration. During pasting, water evaporation cannot be completely prevented but was reduced by covering the stainless steel cup with a lid. Significant water loss could result in overestimation of viscosity.

The starch suspensions were heated from 50° C. to 91° C. (to prevent boiling of the sample since water boils at approximately 95° C. in Pretoria) and held at this temperature for 10 min (short pasting) and 90 min (extended pasting) to determine pasting properties. The rate of stirring with the Rheometer paddle was maintained at 160 rpm during pasting with the exclusion of the initial stirring at 960 rpm for 10 seconds. The initial 10 sec is used to re-suspend any starch that might have settled at the bottom of the cup so as to form a homogeneous mixture.

Rotational testing was utilised to obtain the rheological information of different starch pastes and low-calorie mayonnaise-type emulsions by varying the shear rate and measuring the resulting apparent viscosity. The shear rate increased stepwise from 0.001 to 1000 s−1 followed by a stepwise decrease to the initial shear rate 0.001 s−1. For each ramp (increasing and decreasing shear rate) 36 points were measured with an integration time of 12 s and a decreasing delay time starting with 30 s. A serrated plate was used to measure the flow properties of different starch pastes due to its ability to accommodate limited sample and reduce wall-slip effects. A vane-geometry with four blades was used to induce the shear for the low-calorie mayonnaise-type emulsion samples. This vane-geometry was preferred amongst others geometries because it disturbs a minimum amount of sample before testing and also reduces serious wall-slip effects (Barnes and Nguyen, 2001). Wall slip is the detachment of material from the surface of the cup and may lead to underestimation of viscosity and irreproducibility (Barnes, 1995). The flow properties of the starch pastes were characterized using the Power-Law model ($\sigma=K\dot{\gamma}n$), were $\sigma$ is the shear stress (Pa·s), K is the consistency coefficient (Pa·sn), $\dot{\gamma}$ is the shear rate (1/s) and n is the flow behaviour index (n>1 for a shear thickening and n<1 for shear thinning). The main disadvantage of this model is that flow curves of the starch pastes cannot be fitted at low-shear (<0.1 s−1) and high-shear (>100 s−1) range.

3.1.3 Starch: Molecular and Microstructure

The gelatinised and un-gelatinised starch was visualized with a light microscope equipped with a polarizing filter lens. The starch paste was dispersed in 30% glycerol. The 30% glycerol functions to keep the specimen hydrated and may also help reduce the movement of starch granules on the glass slide due to its high consistency (higher viscosity than water). Maize starch has a high degree of internal organization and possesses a semi-crystalline structure which exhibit birefringence when exposed to polarised light. The un-gelatinised starch appears bright against the dark field and each granule shows a Maltese cross (Esau, 1977). The structural integrity and shape of starch granules were analysed with the same light microscope without the aid of a polarising filter. To enhance the image contrast, a drop of iodine solution was added to stain starch as iodine interacts with amylose to form a blue black colour. Images were taken with 200× magnification and evaluated with the ImageJ® software package.

DSC was used to measure the melting temperatures of unmodified maize and lipid-modified starch. DSC measures the difference in the quantity of heat energy absorbed between the sample and reference while maintaining a zero-degree difference between the two (Höhne et al., 2003).

The sample and reference are placed on heating elements in a chamber and are subjected to progressive heating at the same time at a constant heating rate. Structural transitions are accompanied by heat flow differences between sample and reference and a heat flow vs temperature curve is produced. For the measurement of melting temperature ranges, freeze-dried powder of unmodified starch or lipid-modified starch was weighed into 100 μL aluminum pans followed by water and the pan was hermetically sealed to avoid moisture loss during incubation. Starch suspension was heated from 30° C. to 140° C. at a heating rate of 10° C./min and an empty crucible was used as a reference. The DSC analysis was conducted under nitrogen pressure (4 MPa). Water has a specific boiling point (~95° C. in Pretoria) at atmospheric pressure, however if pressure is applied, higher temperatures are required to pull apart the molecules of water into the gaseous phase therefore at 4 MPa, the boiling point is about 250° C. Therefore, scanning can be performed without losing water through boiling.

3.2 Discussion of Results 3.2.1 The Rheological Properties of Maize Starch with and without Monoglyceride and Ascorbyl Palmitate During Pasting The addition of monoglyceride and ascorbyl palmitate to normal maize starch before short (10 min holding at 91° C.) and extended (90 min holding at 91° C.) pasting increased the pasting time and temperature (Table 2.1-1) as compared to the maize starch alone (control). Lipids may form a hydrophobic layer around the granules which reduces water transport into the granule. The pasting properties are dependent on the accessibility of starch granules to hydration (Taggart and Mitchell, 2009) thus the pasting time and temperature increased because the lipids may be acting as a barrier to reduce water accessibility.

Maize starch granules have been reported to have pores on their surface (Fannon et al., 1992), and these pores extend into the granules (Gallant et al., 1997, Huber and BeMiller, 2000). Water molecules may also be absorbed into the starch granules through these pores. Monoglyceride and ascorbyl palmitate can saturate and block these pores thereby further reducing water absorption.

The pasting time and temperature were increased with an increase (from 5% to 10%) in the concentration of both monoglyceride and ascorbyl palmitate during pasting of maize starch (Table 2.1-1). At high concentrations (10% w/w of starch), monoglyceride and ascorbyl palmitate form a thicker hydrophobic layer on the surface of the starch granules that resulted in further reduction of water absorption by the starch granules.

The maize starch granules absorbed limited water in the presence of monoglyceride and ascorbyl palmitate (Table 2.5-1), thus limited swelling (reduced granular size). The swelling ability of the starch granules during pasting may be influenced, initially by the formation of a hydrophobic layer (reducing water absorption) and then by the formation of amylose-lipid complexes after gelatinization.

Despite the restricted starch granular swelling, the addition of either monoglyceride or ascorbyl palmitate resulted in a continuous increase in paste viscosity for maize starch but without the apparent peak viscosity that was noticeable for maize starch only (FIGS. 3 and 4). The continuous increase in paste viscosity can be attributed to the formation of amylose-lipid complexes. The amylose-lipid complexes can possibly occur on the surface of the granule. On the surface, these amylose molecules may interact with the added monoglyceride and ascorbyl palmitate. The viscosity increase might be attributed to the formation of entanglements between starch-lipid complexes on the surface of the granules. It can be suggested that as heating of starch with added monoglyceride and ascorbyl palmitate progresses, the degree of networks and entanglements between granules will increase and strengthen, due to the increase in amylose protrusions from the granules consequently increasing the viscosity continuously.

The viscosity of maize starches with added ascorbyl palmitate was lower as compared to their monoglyceride counterparts during holding at 91° C. for both short and extended pasting (FIGS. 3 and 4). The difference in viscosity of starch paste with added monoglyceride and ascorbyl palmitate (AP) may be influenced by the structural differences between these two lipids during pasting. Both monoglyceride and ascorbyl palmitate (AP) possess a hydrocarbon tail however the latter has a heteromonocyclic head (bigger) as opposed to the glyceride head (smaller) of the former. The ascorbyl group may cause higher steric hindrance compared to the glyceride group resulting in reduced level of amylose-AP complexes. The limited interactions between ascorbyl palmitate and amylose, could yield low viscosity due to decreased formation of amylose-AP networks on the surface of the starch granules.

In this current study, the formation of amylose-lipid complexes during pasting of maize starch with added monoglyceride and ascorbyl palmitate were shown with differential scanning calorimetry (DSC). It can be seen in FIGS. 9 and 10 that the addition of either monoglyceride or ascorbyl palmitate to normal maize starch resulted in two endothermic peaks. The first endothermic peak can be due to the melting of un-complexed monoglyceride and ascorbyl palmitate, whereas the second endothermic peak can be attributed to the dissociation of amylose-lipid complexes.

The melting transition of excess monoglyceride and ascorbyl palmitate (FIGS. 9 and 10) was observed at about the same temperature as the gelatinization transition of normal maize starch therefore it may be argued that the observed endothermic peak represented either transitions or both. However, the gelatinization transition may be disregarded since the normal maize starch with and without monoglyceride and ascorbyl palmitate were characterized by a complete loss of birefringence as visualised under polarized light (FIGS. 13 and 14). Maize starch in its native form, exhibits birefringence which may serve as an indication of its crystalline characteristic. Loss of birefringence in starch granules is associated with gelatinization (irreversible disruption of the crystalline order) and can be visualised as the absence of an endothermal peak during DSC analysis (Liu et al., 1991). However maize starch pasted with ascorbyl palmitate and monoglyceride (5 and 10% w/w) had peaks that represented both amylose-lipid complexes and the un-complexed added lipids.

Short (holding at 91° C. for 10 min) pasting for both monoglyceride and ascorbyl palmitate resulted in the formation of amylose-lipid complexes with a melting peak of about 100° C. Type I amylose-lipid complexes have a melting range of 95 to 105° C. (Galloway et al., 1989, Karkalas et al., 1995). It may be concluded that, short pasting favours the formation of less crystalline amylose-lipid structures as a result of reduced duration for nucleation to occur which would yield the highly ordered, type II amylose lipid complexes.

Maize starch with added ascorbyl palmitate resulted in the formation of type I amylose-lipid complexes during extended (holding for 90 min at 91° C.) pasting (Table 2.3-1). The size of the polar head of the lipid can affect the thermal stability of the formed amylose-lipid complex (Eli-asson, 1994). It is possible that ascorbyl palmitate forms inclusion complexes with amylose that are less ordered due to increased steric hindrance caused by the large ascorbate polar head resulting in lower dissociation temperatures as compared to their monoglyceride counterparts.

The DSC thermograms of the maize starch with added monoglyceride exhibited the formation of type II complexes upon extended (90 min at 91° C.) pasting with melting peak of about 115° C. Type II complexes have higher transition temperatures and are formed due to nucleation of type I complexes into structures with well-defined crystalline regions (Biliaderis and Galloway, 1989). Type II complexes can be categorized further as type IIa and type IIb. Galloway et al. (1989) stated that type IIa complexes have melting temperature around 115° C.

An increase in paste viscosity during cooling was observed for maize starch only (control) (FIGS. 3 and 4). The textural analysis showed that maize starch with monoglyceride or ascorbyl palmitate had a thick viscous paste as compared to maize starch that formed a gel (Table 2.4-1). The viscosity increase for maize starch only (control) during cooling is attributed to the entanglements or junction zones formed by amylose molecules in a process referred to as retrogradation (Gidley, 1989). The result of the entanglements is a gel of 'ghost' granules embedded within entwined amylose polymer chains held together by hydrogen bonds and van der Waals forces. The addition of ligands prevents the formation of networks between amylose and amylopectin molecules by increasing the space between the two polymers, thus a lower paste viscosity during cooling.

Light microscopy (FIGS. 13 and 14) suggested that starch without the added lipids showed large masses with no visible individual starch granules, suggesting network formation between leached amylose molecules and remnants of starch granules during pasting. The microstructure of starch pasted with monoglycerides and ascorbyl palmitate showed undisrupted granular structure. This suggests that there was limited leaching of amylose molecules as well as starch granule disintegration due to formation of amylose-lipid complexes on the surface of the granules. These pasted and undisrupted starch granules can be referred to as lipid-modified starch microspheres. Lipid-modified starch microspheres can therefore be defined as partially crystalline, spherical particles with a diameter of about 23 μm that are produced by heat processing of maize starch with added lipids.

3.2.2 The Flow Characteristics and High-shear Stability of Maize Starch Modified with Monoglyceride and Ascorbyl Palmitate Maize starch without monoglyceride or ascorbyl palmitate exhibited longer plateau regions at low shear rates, higher zero shear viscosity and K-value (consistency) before and after homogenization for both pasting durations (FIGS. 5 and 6). Zero shear viscosity and longer plateau region is achieved at low shear rates when disentanglements of polymer networks and reformation are at equilibrium. The increased zero shear viscosity and K-value may be attributed to the entanglements/network formed between amylopectin and amylose during cooling during pasting. Increasing the shear rate disentangles amylopectin-amylose networks, the individual polymers become mobilised, and align in the shear direction thus viscosity is reduced and shear thinning occurs.

Starch pastes with either monoglyceride and ascorbyl palmitate were characterised by shorter plateau regions at low shear rates, lower zero shear viscosity and K-value (FIGS. 5 and 6). It can be hypothesised that the spherical nature of starch granules (starch microspheres) with added monoglyceride and ascorbyl palmitate enables them to start rolling and sliding past each at lower shear rates resulting in shorter plateau regions. The lower zero shear viscosity and K-value may be attributed to the presence of monoglyceride and ascorbyl palmitate which increased the spacing between junction zones resulting in a less compact structure.

Homogenization with a high shear homogenizer at 8000 rpm for 5 minutes had an impact on the zero shear viscosity and the consistency (K-value) of all starch pastes. The zero shear viscosity and K values were reduced upon homogenization probably owing to the disentanglement of the starch molecules for maize starch only (control) and disruption of the networks in lipid-modified starch pastes. Disrupting the molecular networks and entanglements that were formed during pasting results in lipid-modified starch microspheres with lower hydrodynamic volume hence reduced viscosity and K values.

The above is a major finding in the research and was unexpected as starch granules are fragile and are generally disrupted under high shear homogenization. The presence of un-complexed lipids and the formation of amylose-lipid complexes during pasting of maize starch prevented the disruption of starch microspheres under high shear homogenization. The non-disruption of these starch microspheres suggests that, (i) the starch microsphere has high shear stress and elastic properties (ii) and the free and complexed monoglyceride and ascorbyl palmitate on the surface of the starch granules can impart lubrication for starch microspheres to slip through the wall gaps during homogenization. These suggestions may explain why starch pasted with monoglyceride and ascorbyl palmitate at 5 and 10% (w/w of starch) were not disintegrated under high shear homogenization and further investigation is required to explain the mechanisms involved. The fact that the starch microspheres did not disintegrate during homogenization suggest that they can be used to mimic fat globules in emulsions such as mayonnaise.

3.2.3 The Effect of Lipid-modified Starch and its Functionality in a Low-calorie Mayonnaise-Type Emulsion The results showed that low-calorie mayonnaise-type emulsion can be produced with 80 and 100% oil replacement from lipid-modified starch microspheres. Unmodified starch produced a gelling low-calorie mayonnaise-type emulsion as compared to non-gelling low-calorie mayonnaise-type emulsion produced from lipid-modified starch. The gelling ability of unmodified starch and the non-gelling characteristic of lipid-modified starch microspheres has been discussed above. The lipid-modified starch microspheres can be seen in the low-calorie mayonnaise-type emulsion at 80 and 100% after homogenization and it can be suggested that they are acting as fat globules to form the low-calorie mayonnaise-type emulsion. The mechanism by which the starch microspheres are acting as fat globules need further investigation in terms of food physics, tribology and sensory properties. However, the rheology of low-calorie mayonnaise-type emulsion described below shows some potential of lipid-modified starch paste as fat mimetics.

The low-calorie mayonnaise-type emulsion and full fat mayonnaise exhibited a shear thinning behaviour over the whole range of shear rate (FIGS. 15-16). As the shear rate increases, aggregated materials become deformed and eventually get disrupted which results in viscosity reduction.

The low-calorie mayonnaise-type emulsion with maize starch only were characterized by higher apparent viscosity at 80% and 100% oil replacements when compared to those with lipid-modified starches (Table 2.7-1). These findings correspond with the final viscosity of their respective pasting profiles (Table 2.1-1). The higher viscosity of low-fat mayonnaise with maize starch only is attributed to the re-association of leached amylose into the network, embedding remnants of starch granules, however in the presence of lipids (monoglyceride and ascorbyl palmitate) the apparent viscosity is lower due to the formation of amylose-lipid complexes which prevent the re-association of amylose molecules.

The apparent viscosity at 80% oil replacement was lower than at 100% for all the low-calorie mayonnaise-type emulsion samples (Table 2.6-1). In a mixed emulsion system, the oil droplets tend to tightly pack in the spaces between the starch granules which was consistent with results in this study (FIGS. 19 and 20). The packing of these oil droplets interfere with the formation of a compact granular network hence a lower apparent viscosity at 80% than at 100% oil substitution.

Smaller, uniformly dispersed oil droplets were observed for full fat mayonnaise and larger oil droplets were observed when maize starch was used as a fat replacer (FIGS. 19 and 20). The larger particle size may also be due to the adsorption of oil particles to the surface of the starch granules resulting in reduced homogenization efficacy in terms of reducing particle size.

The level of oil replacement had a greater influence on the flow behaviour of the low-fat mayonnaise. At 100% oil replacement, low-fat mayonnaise with either 5% monoglyceride or ascorbyl palmitate (short pasting) had flow properties similar to full fat mayonnaise when the shear rate was increased. The short pasting and 5% lipid concentration produces ideal pastes to be used as fat mimetic with respect to starch granular integrity (less structural damage and reduced leaching of polymers) and viscosity (the leached amylose are unable to retrograde because of the added monoglyceride or ascorbyl palmitate and networks are not strong enough to form a rigid gel-structure).

3.2.4 The Proposed Models of Starch-lipid Interactions and Their Functionalities FIG. 21, depicts the pasting properties of maize starch only in excess water. When starch is suspended in water and heated continuously to relatively high temperatures (>50° C.), the polymers within the starch granules will begin to realign and allow water absorption. The granules start to swell and the viscosity increases as well. The swelling progresses until the granules reach their maximum swelling capacity and the peak viscosity is observed. When the maximum swelling has been established, the granules are disrupted resulting in a viscosity decrease (breakdown viscosity). Starch polymers (mostly amylose) diffuse into the dispersion. When the dispersion is cooled, the amylose and amylopectin realign to form a strong network in a process termed retrogradation. Retrogradation is characterized by an increase in viscosity and with further cooling gives rise to formation of a gel. The gel can be regarded as a network of discontinuous, disrupted starch granules containing amylopectin with continuous amylose molecules. The amylose-amylose and amylose-amylopectin molecular interactions can form junction zones resulting in molecular entanglement.

FIG. 22 shows schematic illustrations of the proposed models of the maize starch with and without added lipids during pasting and homogenization. These proposed models described are based on the results reported in this study and partly by the findings of other researchers. FIG. 22, shows the pasting properties of maize starch with added lipids. The incorporated lipids (monoglyceride and ascorbyl palmitate) at 50° C. appear in their α-gel phase (Sein et al., 2002) and form a layer around the granules. This lipid layer reduces water absorption by the granules. As the temperature increases above the Krafft temperature (melting temperature of an amphiphilic compound in water), the lipids form a highly hydrated liquid crystal lamellar phase (Sein et al., 2002). The transition from α-gel to lamellar phase is characterized by a rapid increase and decrease in viscosity at about 60° C. The increase is attributed to the binding of water to the hydrophilic head of the lipid, whilst the decrease is due to break down of the hydrated lamellar structures through constant stirring and increasing temperature. The lamellar form enables high lipid mobility in the hydrocarbon chains (Larsson et al., 1980).

Lipid with high mobility favours water absorption (viscosity increase) by the granules as they may become more widely distributed throughout the starch solution than form a barrier to water molecules on the surface of the granule. The swelling of the starch granules is limited due to the formation of an insoluble layer of amylose-lipid complexes on the granular surface. This insoluble layer regulates the leaching of amylose molecules, water uptake and maintains the integrity of the granules. The networks and entanglements among the amylose-lipid complex layers on the surface also result in viscosity increase. Some lipids do not interact with hydrophobic cavity of amylose to form amylose-lipid complexes however they get trapped between the interstitial regions of the amylose molecules (Putseys et al., 2010) and aid in the formation of networks and entanglements. The trapped lipids transform into the α-gel phase and abandon the polymer-lipid networks when cooled below the Krafft temperature resulting in a decrease in viscosity.

FIG. 23, illustrates the structural stability of lipid-modified starch granules under homogenization (mechanical shear). During homogenization, the lipid-modified starch microspheres (spherical geometry) are forced through a small shear gap (0.5 mm) where they deform like an 'elastic stress ball' and then return to their original, spherical shape after passing through the shear gap. The elastic characteristic is due to the insoluble layer of amylose-lipid complexes on the granular surface that maintains the structure of the granules by containing the polymers and reducing water uptake. The lipid fraction can also lubricate the shear gap enabling the granules to slip past with minimal resistance. This phenomenon enables the starch microspheres to be used to imitate fat globules in high fat foods emulsions where lipids/oil exist as globules.

4. Conclusions and Recommendations

This study shows that the addition of monoglyceride/ascorbyl palmitate to starch before heat processing enables the formation of a non-gelling, highly viscous paste. The non-gelling, highly viscous paste is mostly composed of non-fragmented, spherical starch granules referred to as lipid-modified starch microspheres. The lipid-modified starch microspheres have the ability to maintain their structural integrity during high mechanical shear i.e. homogenization. The amylose-lipid complexes and excess lipids on the surface of the granules can impart lubricating effect and also maintain the structural integrity of starch granules during homogenization.

The spherical shape and viscous nature of lipid-modified starch microspheres simulate the role of oil globules in an emulsion type food system such as mayonnaise. Low-calorie mayonnaise-type formulations can be produced from lipid-modified and unmodified maize starch pastes however the latter produces low-calorie mayonnaise-type emulsion with undesirable, gelling characteristics.

The spherical geometry and viscous characteristic of lipid-modified starch microspheres reveals their possibilities to function as fat replacers in emulsion-type food systems. The lipid-modified starch microspheres may contribute to weight loss through the replacement of energy-dense, dietary fat in food products. Further research should shed light on the stability (shelf-life, freeze-thaw, and pH) of the lipid-modified starch microspheres and how their formation can be quantified. For future studies, it can be recommended to determine the effects of lipid concentration and size of lipid-modified starch microspheres on the rheological, sensory and tribological properties of emulsions and other multicomponent food systems. This knowledge will assist with the determination of suitable/unsuitable food applications for the lipid-modified starch microspheres and to what extent they can be used as fat replacers without compromising the textural and sensory quality of food products.

The inventor believes that the invention provides a reliable method of producing a non-gelling, non-fragmented lipid-modified starch microsphere which is suitable to be used as a fat replacer in low-calorie foods such as low-fat mayonnaise.

The invention claimed is:

1. A process for preparing a lipid-modified starch paste, comprising the steps of:
   (a) combining starch with a lipid component to provide a suspension, wherein the lipid component is dissolved in a solvent before combining with the starch, the lipid component being in the form of monoglyceride; and
   (b) wet heat processing the suspension to form the lipid-modified starch paste, wherein the solvent is an alcohol.

2. The process as claimed in claim 1, wherein step (a) comprises
   dissolving the lipid component in a solvent to form a lipid component-solvent solution;
   adding the starch to the lipid component-solvent solution to form a slurry; and
   evaporating excess solvent from the slurry to provide the suspension.

3. The process as claimed in claim 2, in which the lipid component-solvent solution has a concentration in the range of approximately 5% to 10% lipid component w/w of the starch added.

4. The process as claimed in claim 1, in which the step of wet heat processing the suspension is in the form of pasting the suspension.

5. The process as claimed in claim 4, in which the pasting includes heating the suspension to a predetermined temperature which is above the gelatinisation temperature of starch and stirring the hydrated suspension at a predetermined stirring speed for a predetermined amount of time, to effect pasting.

6. The process as claimed in claim 5, in which the predetermined temperature is between 80° C. and 95° C. and the predetermined amount of time is at least 10 minutes.

7. The process as claimed in claim 1, in which the starch is in the form of maize starch.

8. The process as claimed in claim 1, wherein the lipid-modified starch paste obtained through the process of claim 1 functions as a fat replacement in foodstuffs.

\* \* \* \* \*